United States Patent
Wenger et al.

(10) Patent No.: US 7,617,436 B2
(45) Date of Patent: Nov. 10, 2009

(54) METHOD, DEVICE, AND SYSTEM FOR FORWARD CHANNEL ERROR RECOVERY IN VIDEO SEQUENCE TRANSMISSION OVER PACKET-BASED NETWORK

(75) Inventors: Stephan Wenger, Tampere (FI); Miska Hannuksela, Ruutana (FI); Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 493 days.

(21) Appl. No.: 11/196,789

(22) Filed: Aug. 2, 2005

(65) Prior Publication Data

US 2007/0033494 A1 Feb. 8, 2007

(51) Int. Cl.
*H03M 13/00* (2006.01)
(52) U.S. Cl. ...................... 714/758; 714/776
(58) Field of Classification Search ............. 714/758, 714/776
See application file for complete search history.

(56) References Cited

U.S. PATENT DOCUMENTS

| | | | | |
|---|---|---|---|---|
| 5,864,554 A * | 1/1999 | Rostoker et al. | ......... | 370/395.6 |
| 5,872,784 A * | 2/1999 | Rostoker et al. | ....... | 370/395.64 |
| 5,887,187 A * | 3/1999 | Rostoker et al. | .............. | 712/29 |
| 5,943,371 A * | 8/1999 | Beale et al. | .................. | 375/341 |
| 5,956,102 A * | 9/1999 | Lane | ........................ | 348/425.4 |
| 5,982,459 A * | 11/1999 | Fandrianto et al. | ........ | 348/425.3 |
| 6,016,401 A * | 1/2000 | Rostoker et al. | .............. | 712/29 |
| 6,026,088 A * | 2/2000 | Rostoker et al. | ....... | 370/395.53 |
| 6,407,998 B1 * | 6/2002 | Polit et al. | .................. | 370/365 |
| 6,418,169 B1 * | 7/2002 | Datari | ................... | 375/240.28 |
| 6,425,129 B1 * | 7/2002 | Sciammarella et al. | ........ | 725/38 |
| 7,139,964 B2 * | 11/2006 | Shen et al. | ................... | 714/758 |
| 7,149,953 B2 * | 12/2006 | Cameron et al. | ............ | 714/794 |
| 7,159,170 B2 * | 1/2007 | Shen et al. | ................... | 714/801 |
| 7,185,270 B2 * | 2/2007 | Shen et al. | ................... | 714/801 |
| 7,216,283 B2 * | 5/2007 | Shen et al. | ................... | 714/752 |

(Continued)

FOREIGN PATENT DOCUMENTS

WO 03/034747 4/2003

(Continued)

OTHER PUBLICATIONS

International Application No. PCT/IB2006/001399, Form PCT/ISA/220 (1 page) dated Dec. 13, 2006 with Form PCT/ISA/210 (5 sheets) and Form PCT/ISA/237 (5 pages) Transmitting International Search Report and Written Opinion of the International Searching Authority (EPO).

*Primary Examiner*—Joseph D Torres

(57) ABSTRACT

Accelerated video decoding makes use of FEC-repaired media packets that become available through FEC decoding later than their intended decoding time, so to re-establish the integrity of the prediction chain between predicted pictures. The decoder state may be stored at the time of reception of an erroneous packet or at the time of identification of a lost packet, and decoding continued. After FEC repair, the last known state of the decoder is restored after the lost/damaged packet(s) is (are) resurrected through FEC, and accelerated decoding accordingly is used. Cycles "reserved" for decoding of a sub-sequence may be utilized. By freezing the decoded frame at the begin of a sub-sequence and decoding coded pictures of the main sequence that are part of the previous FEC block the integrity of the main prediction chain may be established again. Alternatively, cycles from enhancement layer decoding may be used.

28 Claims, 12 Drawing Sheets

U.S. PATENT DOCUMENTS

| | | | |
|---|---|---|---|
| 7,230,987 B2 * | 6/2007 | Demas et al. | 375/240.28 |
| 7,243,287 B2 * | 7/2007 | Cameron et al. | 714/752 |
| 7,257,764 B2 * | 8/2007 | Suzuki et al. | 714/774 |
| 7,274,740 B2 * | 9/2007 | van Beek et al. | 375/240.02 |
| 7,281,192 B2 * | 10/2007 | Shen et al. | 714/757 |
| 7,320,099 B2 * | 1/2008 | Miura et al. | 714/748 |
| 7,322,005 B2 * | 1/2008 | Shen et al. | 714/801 |
| 7,383,493 B2 * | 6/2008 | Shen et al. | 714/801 |
| 2002/0122490 A1 | 9/2002 | Lin et al. | |
| 2002/0159525 A1 | 10/2002 | Jeong | |
| 2004/0047424 A1 | 3/2004 | Ramaswamy et al. | |

FOREIGN PATENT DOCUMENTS

| | | |
|---|---|---|
| WO | 2005/112449 | 11/2005 |

\* cited by examiner

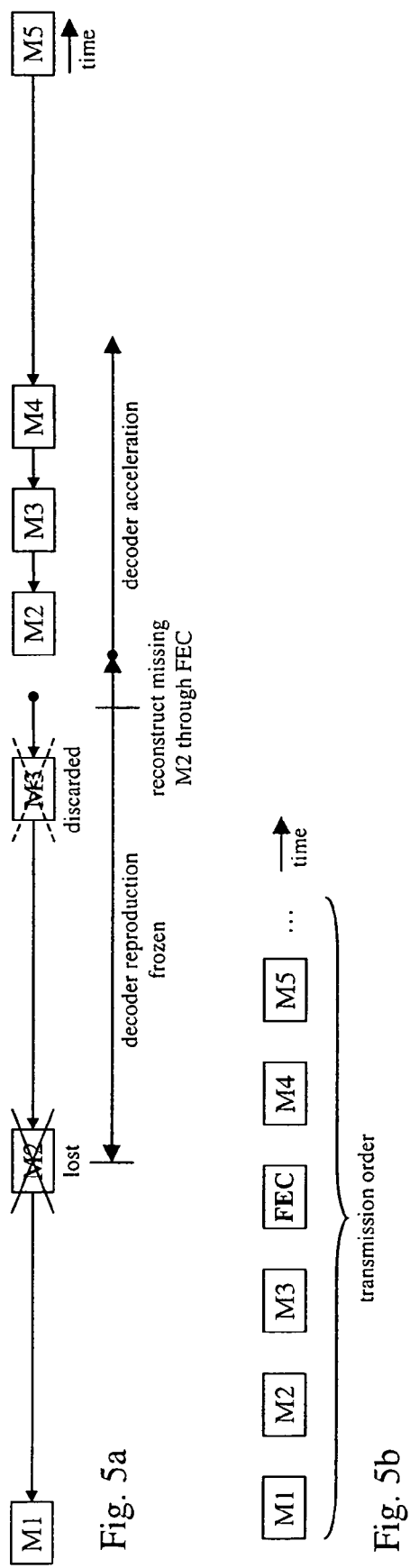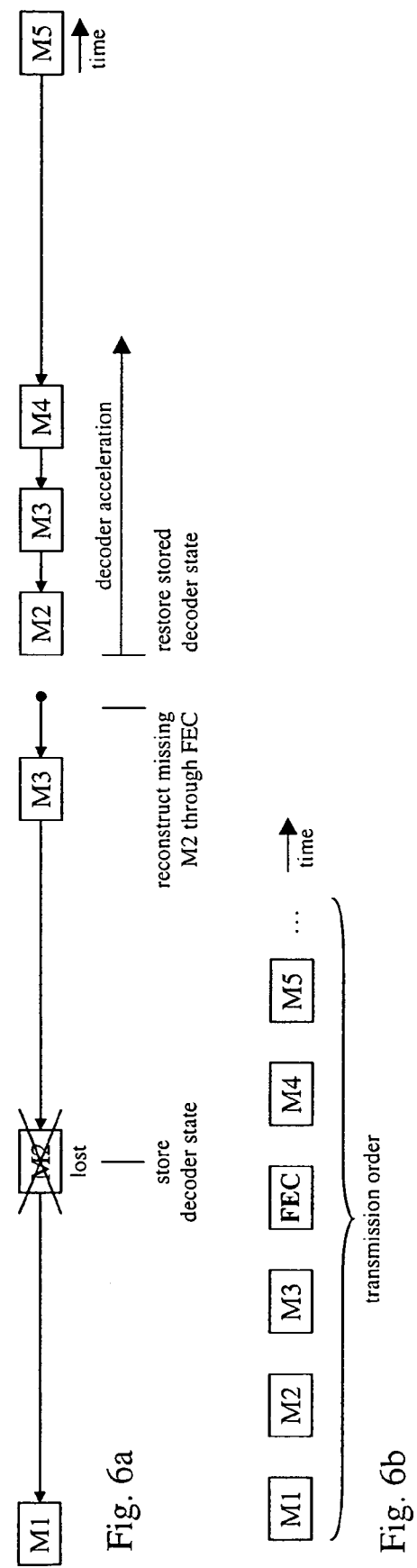

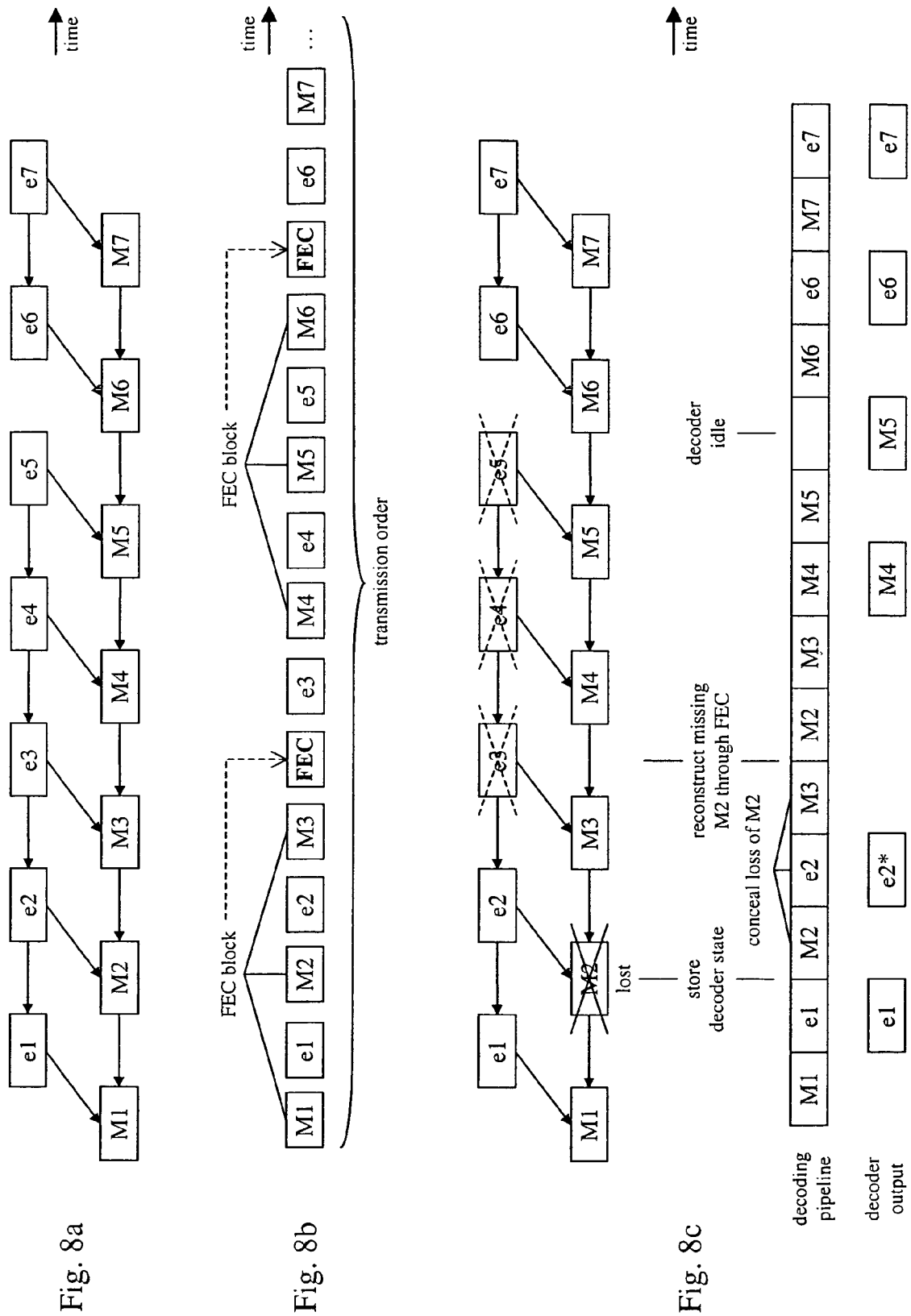

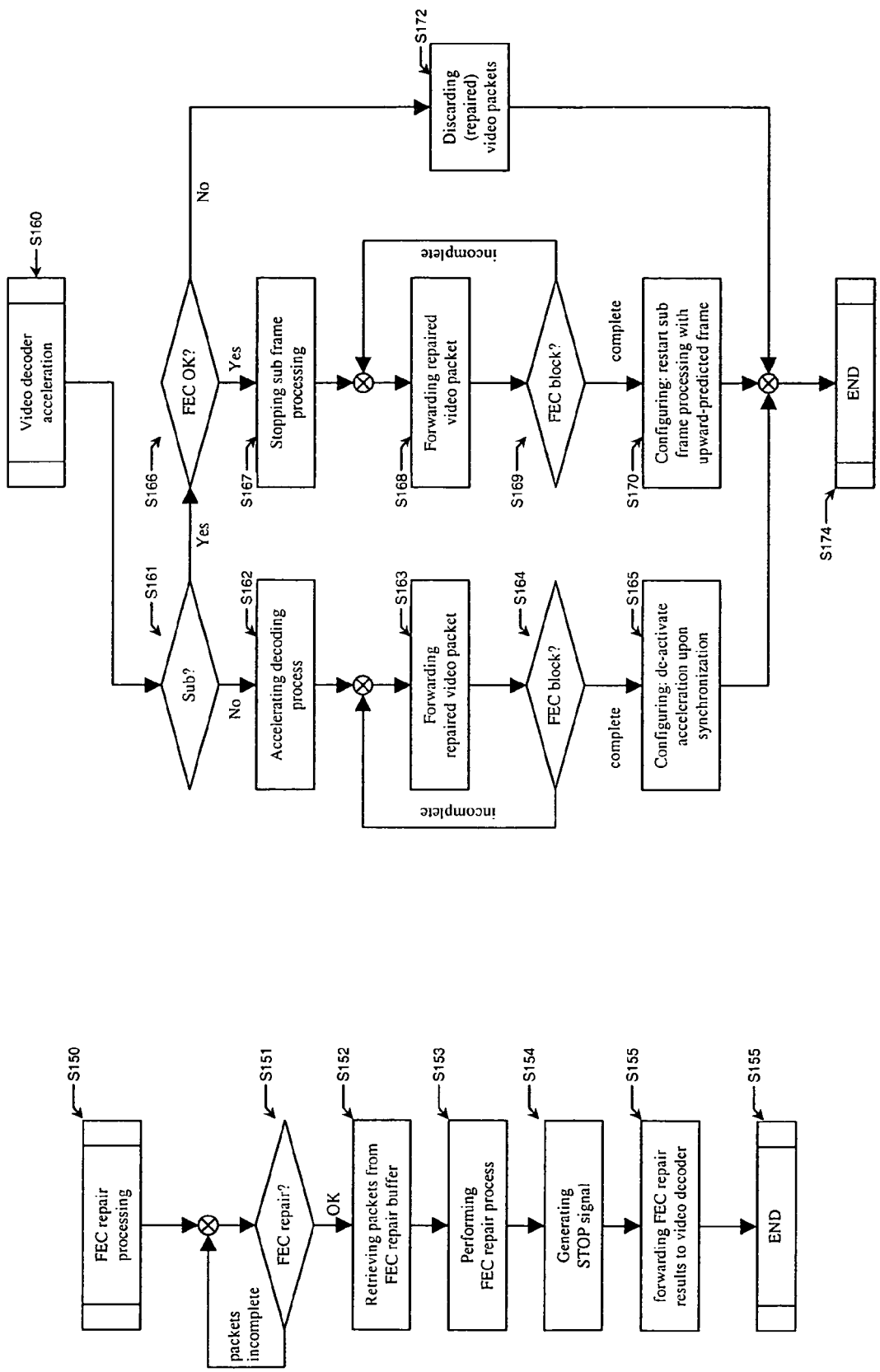

METHOD, DEVICE, AND SYSTEM FOR FORWARD CHANNEL ERROR RECOVERY IN VIDEO SEQUENCE TRANSMISSION OVER PACKET-BASED NETWORK

BACKGROUND OF THE INVENTION

The present invention relates to the field of video decoding. In particular, the present invention relates to field of decoding of video sequences transmitted over erasure prone communication networks.

In 3$^{rd}$ Generation Partnership Project (3GPP) Packet Switched Conversational (PSC) services, as well as in many other packet-based video transmission systems e.g. those complying with ITU-T (International Telecommunication Union—Telecommunication Standardization Sector) Recommendation H.323 or Session Initiation Protocol (SIP; see also RFC 3261 (published by the Network Working Group of the Internet Engineering Task Force (IETF), which is part of the Internet Society (ISOC)) standard, compressed video (and encoded video, respectively) is conveyed over an IP/UDP/RTP (Internet Protocol/User Datagram Protocol/Real-Time transport Protocol) transport environment. In this environment, RTP (Real-Time transport Protocol) packets can get lost in transmission, especially when transmitted over erasure prone communication networks such as cellular networks for public land mobile communication services. A single RTP packet carries parts, one complete, or a multitude of complete encoded video frames, respectively. It should be noted that a frame can comprise either all pixels of a picture or only a subset known as a field. Hence, a picture comprises zero, one or two frames. The term "picture" will be used for all pixels to be reproduced at the same time, whereas the term "coded picture" shall be used for the compressed representation of a picture.

Encoded video is vulnerable to transmission errors and erasures. Since all modern video codecs are based on temporal prediction, missing information in the bit-stream leads not only to annoying artifacts in the reconstructed frame, in which the error occurred, but also in the following reconstructed frames, which may be predicted from one or more frames previous in time. In case of lacking error correction mechanisms, and depending on the content, the detonation in the frames may be amplified within a few seconds to a point, where the reconstructed video is no more useful.

To combat this situation, many tools have been developed, which can be divided into three categories.

The first category aims towards making the bit-stream itself less vulnerable, by inserting redundant information. Examples for these source coding based tools include segmentation, Independent decoder (IDR) macro-block (MB) refresh (known as intra macroblock refresh in older video compression standards), independent decoder frame/picture refresh (known as intra picture refresh in older video compression standards), flexible macro-block (MB) ordering, sub-sequences, and others (see for example Wang, Wenger et. al. "Error Resilient Video Coding Techniques", IEEE Signal Processing Magazine, Vol. 17, No. 4, July 2000, ISSN: 1053-5888). The key aspect of these source-coding mechanisms is that they do not add significant delay. However, they are not very efficient from a compression and bandwidth-usage point-of-view, which is especially critical aspect when considering transmissions over mobile networks, which physical resources are limited and shared among several communication service subscribers.

The second category employs application layer feedback to inform the sender/transmitter/network source about losses perceived by the receiver. The sender may be instructed, for instance, to react by packet retransmission, frame retransmission, reference frame selection, intra/IDR coding of known-as-corrupt areas at the time the video encoder at receiver side learns about the loss situation (a technology known as error tracking) and other means. The use of feedback-based reliable transport protocols, e.g. TCP, may also fall in this category. Feedback-based mechanisms have the general disadvantage of requiring feedback channels, and hence are not applicable to some scenarios, e.g. unicast or highly unsymmetrical links and (point-to-) multipoint or broadcast multipoint communication. Furthermore, depending on the round-trip delay, many feedback-based mechanisms add too much delay for conversational applications. For example refer to Wang and Wenger discussing Feedback-based mechanisms in more detail.

The third category comprises mechanisms to reduce the erasure rate as perceived by the media receiver in the transport. Commonly used here are various forms of forward error correction (FEC), e.g. Audio Redundancy Coding (RFC 2198, published by the Network Working Group, IETF/ISOC) and packet-based forward error correction, which implementation is for instance disclosed in U.S. Pat. No. 6,141,788 by Rosenberg J. D. et al. as well as published as RFC 2733 (published by the Network Working Group, IETF/ISOC). A different scheme that is targeted towards conversational video communication is disclosed in U.S. Pat. No. 6,421,387 by Rhee I, who purposes a new forward error correction (FEC) technique, which is based on an error recovery scheme called Recovery from Error Spread using Continuous Updates (RESCU). Yet another, more sophisticated FEC mechanism is part of the 3GPP Technical Specification TS 26.346, "Multimedia Broadcast/Multicast Service (MBMS); Protocols and codecs (Release 6)" issued by the 3$^{rd}$ Generation Partnership Project (3GPP). Packet-based forward error correction works by generating one or more repair packets from a number of source packets, called source block. Many algorithms have been studied in this field, from simple XOR, over Reed-Solomon, to modern complex codes. At the receiver side, the repair packets allow the reconstruction of missing source packets. It should be mentioned that FEC is the more efficient and the better adjustable to the actual error rates the larger the FEC block is chosen. Large FEC source blocks (encompassing data of many video packets and requiring many hundred milliseconds or even seconds to transmit) are also beneficial to overcome bursts of packet losses which are common for wireless networks.

As a general rule, transport and feedback-based repair mechanisms are more efficient than bit-stream-based repair mechanisms. The precise operation point varies with the protection mechanism, the content, the required quality, and the compression mechanism. However, as a rough estimate, to combat 10% loss rate a typical FEC-based mechanism requires perhaps less than 15% additional bit rate (including overhead), whereas a source coding based mechanism could require at least 50% additional bit rate. On the other hand, the source coding based mechanisms are essentially neutral to the delay, whereas a FEC mechanism with 15% overhead (as assumed above) adds a delay of at least 7 frames/pictures, assuming a one-frame-one-packet strategy (which is common in 3GPP Packet Switched Conversational). Such an added delay is unacceptable from an application point-of-view, especially when considering conversational applications.

BRIEF SUMMARY OF THE INVENTION

Object of the present invention is to provide a concept, which overcomes the above described drawbacks by employing a forward error correction mechanism enabling reasonable error correction while considering aspects of the used bandwidth, which is especially constricted in wireless data communication networks. It should be noted that the limitation of the required bandwidth is also a major aspect in wired networks, which enable network access of a huge number of connected clients sharing the same network resources.

The object is solved by a method, a computer program product, a device, a decoder module, a system, and a controlling module as defined in the accompanying claims.

According to an aspect of the present invention, a method for optimized error recovery in video sequence transmission over an erasure prone packet-based network is provided. A plurality of data packets is received via the network. One or more data packets are video data packets, which are adapted to code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. Each video data packet received is checked for loss (on the basis of a packet numbering) and, when received, for data error therein. In case that the check has indicated that either a video data packet has been lost during transmission or the data integrity of the video data packet is defective; an error recovery process is initiated, wherein each video data packet belonging to said error recovery block is stored in a repair buffer to enable said error recovery process.

The error recovery process is to be initiated and performed on the basis of the number of video data packets encompassed in the error recovery block, which said lost or erroneous video data packet belong to, and the one or more repair data packets, which are associated with the error recovery block, when at least a mathematically sufficient number of said video data packets and said repair packets are available to successfully complete said error recovery process. The error recovery process results in repaired video data packets on the basis of the video data packets encompassed in the error recovery block and available for the error recovery process. Thereafter, decoding of at least one repaired video data packets is carried out. Especially, the decoding is performed with at least one repaired video data packet and, if necessary, one or more video data packets following the first of the repaired video data packets, preferably in an untimely manner, is carried out, for further processing. The expression "untimely manner" here is to indicate that the decoding is performed not at the usual time, i.e. the time the packet would have been decoded if it were not lost/damaged and would not need recovery. An untimely encoding can be understood as an accelerated decoding or as a late or delayed decoding using cycles reserved for the enhancement layer.

According to an embodiment of the present invention, a delaying of said decoding of said repaired video data packets and all video data packets following the first of said repaired video data packets, for a period of waiting time, is carried out, said waiting time ending when said error recovery process is terminated and said repaired video data packets are available; and accelerating a decoding frame rate of a video decoder decoding said repaired video data packets and all video data packets following the first of said repaired video data packets follows; further comprising de-accelerating said decoding frame rate when synchronization with an original frame time sequence is achieved.

According of an embodiment of the present invention, as soon as (after) said checking of said video data packets for loss or data error, which results in an indication for a loss or data error, said decoder saves a decoder state to a decoder state buffer, wherein said decoder state buffer is used to restore said decoder state before said untimely decoding of said repaired video data packets and all video data packets following the first of said repaired video data packets, for being further processed.

According of an embodiment of the present invention, said video sequence coded on the basis of said video data packets is layered encoded including a base layer and at least one enhancement layers. The error recovery blocks encompass video data packets belonging to a base layer and one or more first enhancement layers. The layered encoded video sequence includes at least one second enhancement layer that is hierarchically above said base layer and said one or more first enhancement layers. The video packets belonging to said one or more second enhancement layers are not included in the error recovery block.

According of an embodiment of the present invention, said base layer is a main sequence and at least the hierarchically lowest enhancement layer is a sub sequence.

According of an embodiment of the present invention, said untimely decoding of said video decoder comprises suspending decoding of video data packets belonging to at least one of said enhancement layers to gain processing capacity for said untimely decoding.

According of an embodiment of the present invention, decoding of said video data packets, which decoding is suspended, is resumed at the earliest, when an only-upward predicted coded picture is available for decoding.

According of an embodiment of the present invention, decoding of said video data packets, which decoding is suspended, is resumed at the earliest, when synchronization with an original frame time sequence is achieved.

According of an embodiment of the present invention, said untimely decoding comprises suspending decoding of video data packets belonging to said sub-sequence to gain processing capacity for said untimely decoding.

According of an embodiment of the present invention, decoding of said video data packets, which decoding is suspended, is resumed at the earliest, when an only-upward predicted coded picture is available for decoding.

According of an embodiment of the present invention, decoding of said video data packets, which decoding is suspended, is resumed at the earliest, when synchronization with an original frame time sequence is achieved.

According of an embodiment of the present invention, at least said video data packets belonging to said error recovery block are decoded during said error recovery process with exception of one or more lost video data packet.

According of an embodiment of the present invention, any compressed-domain error concealment technique is applied to said video data packets to improve quality.

According of an embodiment of the present invention, any reconstructed-domain error concealment technique is applied to pictures reconstructed from said video data packets to improve quality.

According to an embodiment of the present invention, the error recovery process is performed when all available video data packets encompassed in the error recovery block, which the lost or erroneous video data packet belong to, and the one or more repair data packets, which are associated to the error recovery block, are received, with the exception of at least one lost video data packet.

According to an embodiment of the present invention, each video data packet belonging to the error recovery block is stored in a repair buffer to enable the error recovery process.

According to an embodiment of the present invention, the acceleration is operated by accelerating a decoding frame rate of a video decoder decoding the video data packets at least during decoding of one or more repaired video data packets.

According to an embodiment of the present invention, the decoding frame rate is de-accelerated when synchronization with an original frame time sequence is achieved.

According to an embodiment of the present invention, the acceleration of the decoding comprises suspending decoding of video data packets belonging to at last one of the sub-sequence layers to gain processing capacity to decode the remaining layers.

According to an embodiment of the present invention, the decoding of the video data packets, which decoding is suspended, is resumed when synchronization with an original frame time sequence is achieved.

According to an embodiment of the present invention, decoding of the video data packets is suspended during the error recovery process.

According to an embodiment of the present invention, a current operation state of the video decoder is stored in a buffer.

According to an embodiment of the present invention, the operation state of the video decoder is restored by the means of the stored operation state after finish of the error recovery process.

According to an embodiment of the present invention, at least the video data packets belonging to the error recovery block and available during the error recovery process are decoded for being displayed, with exception of a lost video data packet.

According to an embodiment of the present invention, the error recovery process is operable with forward error correction (FEC) and the error recovery block is a forward error correction block.

According to another aspect of the present invention, a computer program product is provided, which comprises a computer readable medium having a program code recorded thereon for optimized error recovery in video sequence transmission over an erasure prone packet-based network. A code section is provided to receive a plurality of data packets via the network. One or more data packets are video data packets, which code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. A code section is provided to check each the video data packet received for loss (on the basis of a packet numbering) or is check for erroneous data included therein. In case that the check has indicated that either a video data packet has been lost during transmission or the data integrity of the video data packet is defective; an error recovery process is initiated.

A code section is provided to initiate error recovery process to be performed on the basis of the predefined number of video data packets encompassed in the error recovery block, which the lost or erroneous video data packet belongs to, and the one or more repair data packets, which are associated to the error recovery block. The error recovery process results in repaired video data packets on the basis of the video data packets encompassed in the error recovery block and available for the error recovery process. A code section is provided to untimely decode at least one repaired video data packet for being displayed.

According to an embodiment of the present invention, the computer code comprises further a code section for delaying said decoding of said repaired video data packets and all video data packets following the first of said repaired video data packets, for a period of waiting time. The waiting time ends when said error recovery process is terminated and said repaired video data packets are available. A code section is provided for accelerating a decoding frame rate of said video decoder decoding said repaired video data packets and all video data packets following the first of said repaired video data packets; and a code section for de-accelerating said decoding frame rate when synchronization with an original frame time sequence is achieved.

According to an embodiment of the present invention, after checking of said video data packets for loss or data error resulting in an indication for a loss or data error, said code section for decoding saves a decoder state to a decoder state buffer. Said decoder state buffer is used to restore said decoder state before said untimely decoding of said repaired video data packets and all video data packets following the first of said repaired video data packets, for being further processed.

According to an embodiment of the present invention, said video sequence coded on the basis of said video data packets is layered encoded including a base layer and at least one enhancement layers. Said error recovery blocks encompass video data packets belonging to a base layer and one or more first enhancement layers. Said layered encoded video sequence includes at least one second enhancement layer that is hierarchically above said base layer and said one or more first enhancement layers. The video packets belonging to said one or more second enhancement layers are not included in the error recovery block.

According to an embodiment of the present invention, said base layer is a main sequence and at least the hierarchically lowest enhancement layer is a sub sequence.

According to an embodiment of the present invention, a code section is provided for suspending decoding of video data packets belonging to at least one of said enhancement layers to gain processing capacity for said untimely decoding.

According to an embodiment of the present invention, a code section is provided for resuming decoding of said video data packets, where decoding is suspended, at the earliest, when an only-upward predicted picture is available for decoding.

According to an embodiment of the present invention, a code section is provided for resuming decoding of said video data packets, which decoding is suspended, at the earliest, when synchronization with an original frame time sequence is achieved.

According to an embodiment of the present invention, a code section is provided for suspending decoding of video data packets, which belong to said sub-sequence in order to gain processing capacity for said untimely decoding.

According to an embodiment of the present invention, a code section is provided for resuming decoding of said video data packets, where decoding is suspended, at the earliest, when an only-upward predicted picture is available for decoding.

According to an embodiment of the present invention, a code section is provided for resuming decoding of said video data packets, where decoding is suspended, at the earliest, when synchronization with an original frame time sequence is achieved.

According to another aspect of the present invention, a portable device is provided to enable forward channel error recovery in video sequence transmission over an erasure prone packet-based network. The device, especially a portable CE device comprises a network interface, which is adapted to receive a plurality to plurality of data packets via the network. One or more data packets are video data packets, which code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. An error recovery module of the device is adapted to check each of the video data packets received for loss (on the basis of a packet numbering) or for erroneous data included therein. In case that the check has indicated that either a video data packet has been lost during transmission or the data integrity of the video data packet is defective; an error recovery process is initiated. The error recovery module initiates an error recovery process is to be performed on the basis of the predefined number of video data packets encompassed in the error recovery block, which the lost or erroneous video data packet belongs to, and the one or more repair data packets, which are associated to the error recovery block. The error recovery process results in repaired video data packets on the basis of the video data packets encompassed in the error recovery block and available for the error recovery process. A video decoder or decoding component is provided to decode at least one repaired video data packet. Especially, the decoding is performed with at least one repaired video data packet and, if necessary, one or more video data packets following the first of the repaired video data packets, preferably in an untimely manner, is carried out, for further processing.

According to embodiments of the present invention, a component is provided for delaying said decoding of said repaired video data packets and all video data packets following the first of said repaired video data packets, for a period of waiting time. Said waiting time ends when said error recovery process is terminated and said repaired video data packets are available. A component is provided for accelerating a decoding frame rate of a video decoder decoding said repaired video data packets and all video data packets following the first of said repaired video data packets and a component is provided for de-accelerating said decoding frame rate when synchronization with an original frame time sequence is achieved.

According to embodiments of the present invention, after (as soon as) check of said video data packets for loss or data error results in an indication for a loss or data error, said decoder is adapted to save a decoder state to a decoder state buffer. The decoder state buffer is used to restore said decoder state before said untimely decoding of said repaired video data packets and all video data packets following the first of said repaired video data packets, for being further processed.

According to embodiments of the present invention, said video sequence coded on the basis of said video data packets is layered encoded including a base layer and at least one enhancement layers. The error recovery blocks encompass video data packets belonging to a base layer and one or more first enhancement layers and the layered encoded video sequence includes at least one second enhancement layer that is hierarchically above said base layer and said one or more first enhancement layers. The video packets belonging to said one or more second enhancement layers are not included in the error recovery block.

According of an embodiment of the present invention, said base layer is a main sequence and at least the hierarchically lowest enhancement layer is a sub sequence.

According of an embodiment of the present invention, a code section is provided for suspending decoding of video data packets belonging to at least one of said enhancement layers to gain processing capacity for said untimely decoding.

According of an embodiment of the present invention, a code section is provided for resuming said decoding of said video data packets, which decoding is suspended, at the earliest, when an only-upward predicted coded picture is available for decoding.

According of an embodiment of the present invention, decoding of said video data packets, which decoding is suspended, is resumed at the earliest, when synchronization with an original frame time sequence is achieved.

According of an embodiment of the present invention, a component is provided for suspending decoding of video data packets belonging to said sub-sequence to gain processing capacity for said untimely decoding.

According of an embodiment of the present invention, decoding of said video data packets, which decoding is suspended, is resumed at the earliest, when an only-upward predicted coded picture is available for decoding.

According of an embodiment of the present invention, decoding of said video data packets, which decoding is suspended, is resumed at the earliest, when synchronization with an original frame time sequence is achieved.

According of an embodiment of the present invention, comprises a code section for decoding at least said video data packets belonging to said error recovery block during said error recovery process with exception of one or more lost video data packet.

According of an embodiment of the present invention, a code section is provided for applying any compressed-domain error concealment technique to said video data packets to improve quality.

According of an embodiment of the present invention, a code section is provided for applying any reconstructed-domain error concealment technique to pictures reconstructed from said video data packets to improve quality.

According to an embodiment of the present invention, the error recovery process is performed when all available video data packets encompassed in the error recovery block, which the lost or erroneous video data packet belong to, and the one or more repair data packets, which are associated to the error recovery block, are received, with the exception of at least one lost video data packet.

According to an embodiment of the present invention, each video data packet belonging to the error recovery block is stored in a repair buffer to enable the error recovery process.

According to an embodiment of the present invention, a component is provided to accelerate a decoding frame rate of a video decoder decoding the video data packets at least during decoding of the repaired video data packets.

According to an embodiment of the present invention, a component is provided for de-accelerating the decoding frame rate when synchronization with an original frame time sequence is achieved.

According to an embodiment of the present invention, the video sequence coded on the basis of the video data packets is a layered encoded video sequence, which includes a main sequence layer and one or more sub-sequence layers. One or more video data packets code a video frame belonging to the main sequence layer and one or more video data packets code a video frame belonging to one of the sub-sequence layer. The error recovery blocks encompass video data packets belonging to the main sequence layer.

According to an embodiment of the present invention, a component is provided for suspending decoding of video data packets belonging to at last one of the sub-sequence layers to gain processing capacity to decode the remaining layers.

According to an embodiment of the present invention, a component is provided for resuming the decoding of the video data packets, which decoding is suspended, at the earliest, when one or more video data packets are available for decoding, which code an only-upward predicted frame.

According to an embodiment of the present invention, a component is provided for resuming the decoding of the video data packets, which decoding is suspended, when synchronization with an original frame time sequence is achieved.

According to an embodiment of the present invention, a component is provided for suspending decoding of the video data packets during the error recovery process.

According to an embodiment of the present invention, a buffer is provided to enable storing of a current operation state of the video decoder.

According to an embodiment of the present invention, a component is provided to enable restoring of the operation state of the video decoder by the means of the stored operation state after finish of the error recovery process.

According to an embodiment of the present invention, a component for decoding at least the video data packets belonging to the error recovery block and available during the error recovery process for being displayed is provided, with exception of a lost video data packet.

According to an embodiment of the present invention, a component enabling any compressed domain error concealment technique is provided to be applied to the video data packets to improve quality.

According to an embodiment of the present invention, a component enabling any reconstructed domain error concealment technique is provided to be applied to the reconstructed video data packets to improve quality.

According to embodiments of the present invention, the error recovery module is adapted to perform the error recovery process when all video data packets encompassed in the error recovery block, which the lost or erroneous video data packet belongs to, and the one or more repair data packets, which are associated to the error recovery block, are received via the network, with exception of a lost video data packet.

According to embodiments of the present invention, the device comprises a repair buffer which stores each video data packets belonging to the error recovery block to enable the error recovery process.

According to embodiments of the present invention, the video decoder is adapted to accelerate a decoding frame rate when decoding video data packets and at least during decoding of the repaired video data packets.

According to embodiments of the present invention, the video decoder is adapted to de-accelerate its decoding frame rate when synchronization with an original frame time sequence is achieved.

According to embodiments of the present invention, the video decoder is adapted to suspend decoding of video data packets belonging to at least one of the sub-sequence layers in order to gain processing capacity to decode the remaining layers.

According to embodiments of the present invention, the video decoder is adapted to resume decoding of the video data packets, which decoding is suspended, at the earliest, when an only-upward predicted frame is available for decoding.

According to embodiments of the present invention, the video decoder is adapted to resume decoding of the video data packets, which decoding is suspended, at the earliest, when synchronization with an original frame time sequence is achieved.

According to embodiments of the present invention, the video decoder is adapted to suspend decoding of the video data packets during the error recovery process.

According to embodiments of the present invention, the video decoder is adapted to store a current operation state of the video decoder in a buffer.

According to embodiments of the present invention, the video decoder is adapted to restore the operation state of the video decoder by the means of the stored operation state after finish of the error recovery process.

According to embodiments of the present invention, the video decoder is adapted to decode at least the video data packets belonging to the error recovery block during the error recovery process, with exception of a lost video data packet.

According to an embodiment of the present invention, the error recovery process is operable with forward error correction (FEC) and the error recovery block is a forward error correction block.

According to another aspect of the present invention, a decoder module is provided, which is enabled for forward channel error recovery in video sequence transmission over an erasure prone packet-based network. The decoder module, especially a vide decoder module, comprises a data input, which is adapted to receive a plurality to plurality of data packets via the network. One or more data packets are video data packets, which code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. An error recovery module of the decoder module is adapted to check of each of the video data packets received for loss (on the basis of a packet numbering) or for erroneous data included therein. In case that the check has indicated that either a video data packet has been lost during transmission or the data integrity of the video data packet is defective; an error recovery process is initiated. The error recovery module initiates an error recovery process is to be performed on the basis of the predefined number of video data packets encompassed in the error recovery block, which the lost or erroneous video data packet belongs to, and the one or more repair data packets, which are associated to the error recovery block. The error recovery process results in repaired video data packets on the basis of the video data packets encompassed in the error recovery block and available for the error recovery process. A video decoder or decoding component is provided to decode at least one repaired video data packet. Especially, the decoding is performed with at least one repaired video data packet and, if necessary, one or more video data packets following the first of the repaired video data packets, preferably in an untimely manner, is carried out, for further processing.

According to embodiments of the present invention, a component is provided for delaying said decoding of said repaired video data packets and all video data packets following the first of said repaired video data packets, for a period of waiting time. Said waiting time ends when said error recovery process is terminated and said repaired video data packets are available. A component is provided for accelerating a decoding frame rate of a video decoder decoding said repaired video data packets and all video data packets following the first of said repaired video data packets and a component is provided for de-accelerating said decoding frame rate when synchronization with an original frame time sequence is achieved.

According to embodiments of the present invention, after (as soon as) check of said video data packets for loss or data error results in an indication for a loss or data error, said decoder is adapted to save a decoder state to a decoder state buffer. The decoder state buffer is used to restore said decoder state before said untimely decoding of said repaired video data packets and all video data packets following the first of said repaired video data packets, for being further processed.

According to embodiments of the present invention, said video sequence coded on the basis of said video data packets is layered encoded including a base layer and at least one enhancement layers. The error recovery blocks encompass video data packets belonging to a base layer and one or more first enhancement layers and the layered encoded video sequence includes at least one second enhancement layer that is hierarchically above said base layer and said one or more first enhancement layers. The video packets belonging to said one or more second enhancement layers are not included in the error recovery block.

According to an embodiment of the present invention, a component for decoding at least the video data packets belonging to the error recovery block and available during the error recovery process for being displayed is provided, with exception of a lost video data packet.

According to an embodiment of the present invention, a component enabling any compressed domain error concealment technique is provided to be applied to the video data packets to improve quality.

According to an embodiment of the present invention, a component enabling any reconstructed domain error concealment technique is provided to be applied to the reconstructed video data packets to improve quality.

According to another aspect of the present invention, a system is provided to enable forward channel error recovery in video sequence transmission over an erasure prone packet-based network. The system comprises a network interface, which is adapted to receive a plurality to plurality of data packets via the network. One or more data packets are video data packets, which code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. An error recovery module of the system is adapted to check each of the video data packets received for loss (on the basis of a packet numbering) or for erroneous data included therein.

In case that the check has indicated that either a video data packet has been lost during transmission or the data integrity of the video data packet is defective; an error recovery process is initiated. The error recovery module initiates an error recovery process is to be performed on the basis of the predefined number of video data packets encompassed in the error recovery block, which the lost or erroneous video data packet belongs to, and the one or more repair data packets, which are associated to the error recovery block. The error recovery process results in repaired video data packets on the basis of the video data packets encompassed in the error recovery block and available for the error recovery process. A video decoder or decoding component is provided to decode at least one repaired video data packet. Especially, the decoding is performed with at least one repaired video data packet and, if necessary, one or more video data packets following the first of the repaired video data packets, preferably in an untimely manner, is carried out, for further processing.

According to embodiments of the present invention, a component is provided for delaying said decoding of said repaired video data packets and all video data packets following the first of said repaired video data packets, for a period of waiting time. Said waiting time ends when said error recovery process is terminated and said repaired video data packets are available. A component is provided for accelerating a decoding frame rate of a video decoder decoding said repaired video data packets and all video data packets following the first of said repaired video data packets and a component is provided for de-accelerating said decoding frame rate when synchronization with an original frame time sequence is achieved.

According to embodiments of the present invention, after (as soon as) check of said video data packets for loss or data error results in an indication for a loss or data error, said decoder is adapted to save a decoder state to a decoder state buffer. The decoder state buffer is used to restore said decoder state before said untimely decoding of said repaired video data packets and all video data packets following the first of said repaired video data packets, for being further processed.

According to embodiments of the present invention, said video sequence coded on the basis of said video data packets is layered encoded including a base layer and at least one enhancement layers. The error recovery blocks encompass video data packets belonging to a base layer and one or more first enhancement layers and the layered encoded video sequence includes at least one second enhancement layer that is hierarchically above said base layer and said one or more first enhancement layers. The video packets belonging to said one or more second enhancement layers are not included in the error recovery block.

According of an embodiment of the present invention, said base layer is a main sequence and at least the hierarchically lowest enhancement layer is a sub sequence.

According to another aspect of the present invention, a controlling module is provided, which is enabled for forward channel error recovery in video sequence transmission over an erasure prone packet-based network. The decoder module, especially a vide decoder module, comprises a data input, which is adapted to receive a plurality to plurality of data packets via the network. One or more data packets are video data packets, which code video frames dedicated for being decoded and displayed in time sequence to present a video to a user. Furthermore, one or more data packets are repair data packets, dedicated for error recovery in the video data packets or at least a selection thereof. An error recovery block encompasses a predefined number of video data packets of the plurality of video packets. The number may be constant or may vary in time during reception of the data packets. Each error recovery block is associated with one or more repair data packets. An error recovery module of the decoder module is adapted to check of each of the video data packets received for loss (on the basis of a packet numbering) or for erroneous data included therein. In case that the check has indicated that either a video data packet has been lost during transmission or the data integrity of the video data packet is defective; an error recovery process is initiated. The error recovery module initiates an error recovery process is to be performed on the basis of the predefined number of video data packets encompassed in the error recovery block, which the lost or erroneous video data packet belongs to, and the one or more repair data packets, which are associated to the error recovery block. The error recovery process results in repaired video data packets on the basis of the video data packets encompassed in the error recovery block and available for the error recovery process. Finally an instructing component is provided, which enables instructing a video decoder or decoding component to decode at least one repaired video data packet. Especially, the decoding is performed with at least one repaired video data packet and, if necessary, one or more video data packets following the first of the repaired video data packets, preferably in an untimely manner, is carried out, for further processing.

According to embodiments of the present invention, the instructing component is also provided to instruct the video decoder for delaying said decoding of said repaired video data packets and all video data packets following the first of said repaired video data packets, for a period of waiting time. Said waiting time ends when said error recovery process is terminated and said repaired video data packets are available. The instructing component further enables to instruct the video decoder for accelerating a decoding frame rate of a video decoder decoding said repaired video data packets and all video data packets following the first of said repaired video data packets and for de-accelerating said decoding frame rate when synchronization with an original frame time sequence is achieved.

According to embodiments of the present invention, after (as soon as) check of said video data packets for loss or data error results in an indication for a loss or data error, said decoder is adapted to save a decoder state to a decoder state buffer. The decoder state buffer is used to restore said decoder state before said untimely decoding of said repaired video data packets and all video data packets following the first of said repaired video data packets, for being further processed.

According to embodiments of the present invention, said video sequence coded on the basis of said video data packets is layered encoded including a base layer and at least one enhancement layers. The error recovery blocks encompass video data packets belonging to a base layer and one or more first enhancement layers and the layered encoded video sequence includes at least one second enhancement layer that is hierarchically above said base layer and said one or more first enhancement layers. The video packets belonging to said one or more second enhancement layers are not included in the error recovery block.

According to an embodiment of the present invention, the instructing component is also provided for instructing the video decoder to decode at least the video data packets belonging to the error recovery block and available during the error recovery process for being displayed is provided, with exception of a lost video data packet.

According to an embodiment of the present invention, a component enabling any compressed domain error concealment technique is provided to be applied to the video data packets to improve quality.

According to an embodiment of the present invention, a component enabling any reconstructed domain error concealment technique is provided to be applied to the reconstructed video data packets to improve quality.

Advantageously, the video decoder utilizes accelerated decoding to make use of FEC-repaired media packets that become available through FEC decoding later than their intended decoding time, so to re-establish the integrity of the prediction chain between predicted pictures. More advantageously, a more sophisticated video decoder implementation stores the decoder state at the time of reception of an erroneous packet or at the time of identification of a lost packet, and continues decoding. After FEC repair, the last known state of the decoder is restored after the lost/damaged packet(s) are resurrected through FEC, and accelerated decoding accordingly is used. Since accelerated decoding is expensive, according to most advantageous embodiment, cycles "reserved" for decoding of a sub-sequence are utilized. By freezing the decoded frame at the begin of a sub-sequence and decoding coded pictures of the main sequence that are part of the previous FEC block enables to establish the integrity of the main prediction chain again. Alternatively cycles from enhancement layer decoding may be used.

Bandwidth aspects are taken into consideration by protecting packets belonging to more than one frame together. The combination of accelerated decoding and FEC repair resulting in an improved user experience is advantageous over the state of the art, especially when considering the combination of cycle-shifting from enhancement layer decoding to base layer decoding.

BRIEF DESCRIPTION OF THE DRAWINGS

Preferred embodiments of the present invention will now be explained with reference to the accompanying drawings of which:

Figure 1:
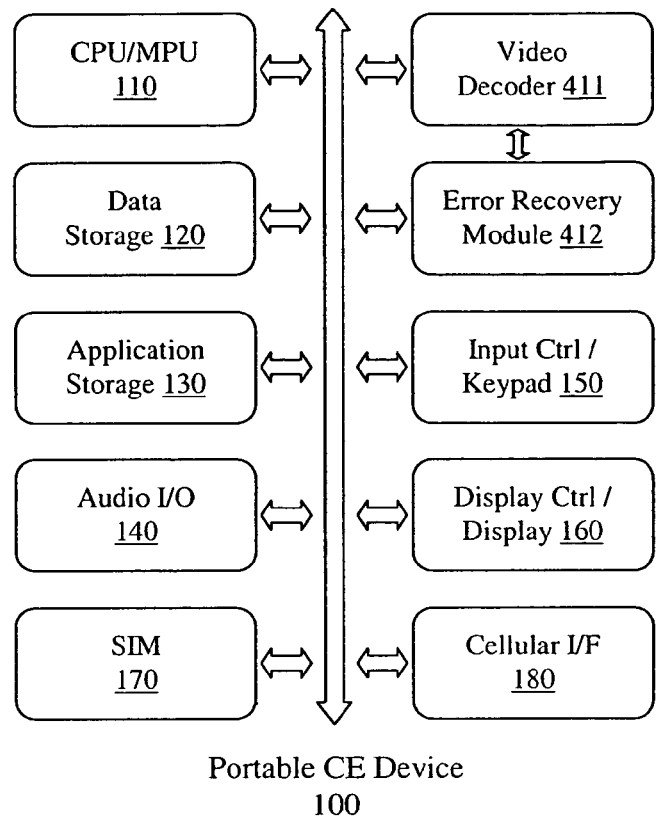
Figure 2:
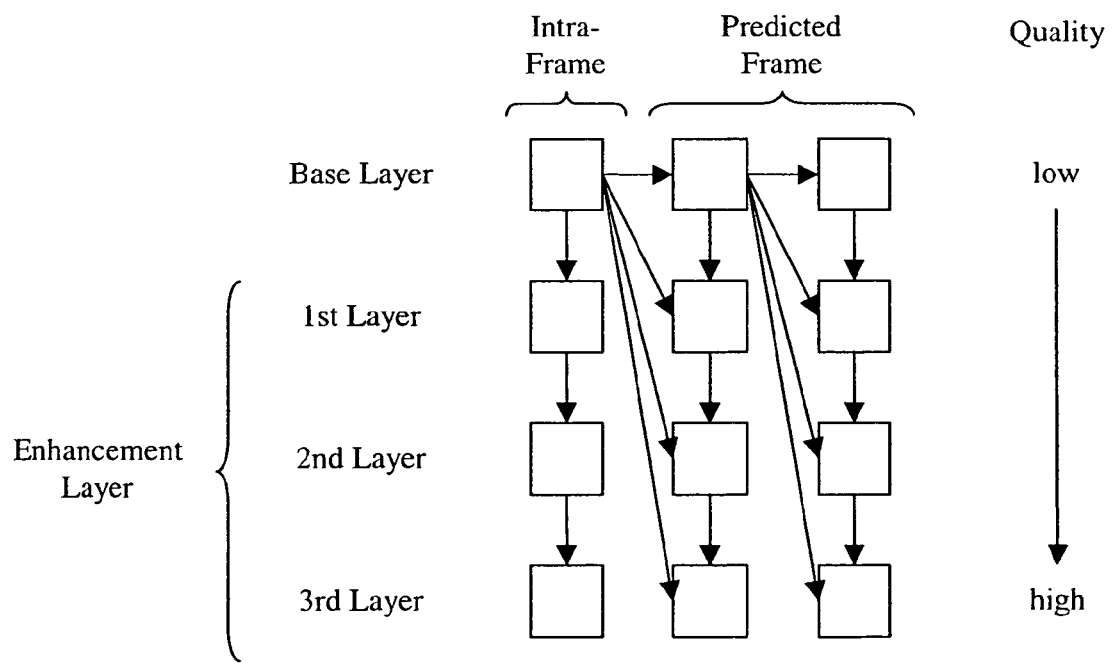
Figure 3A:
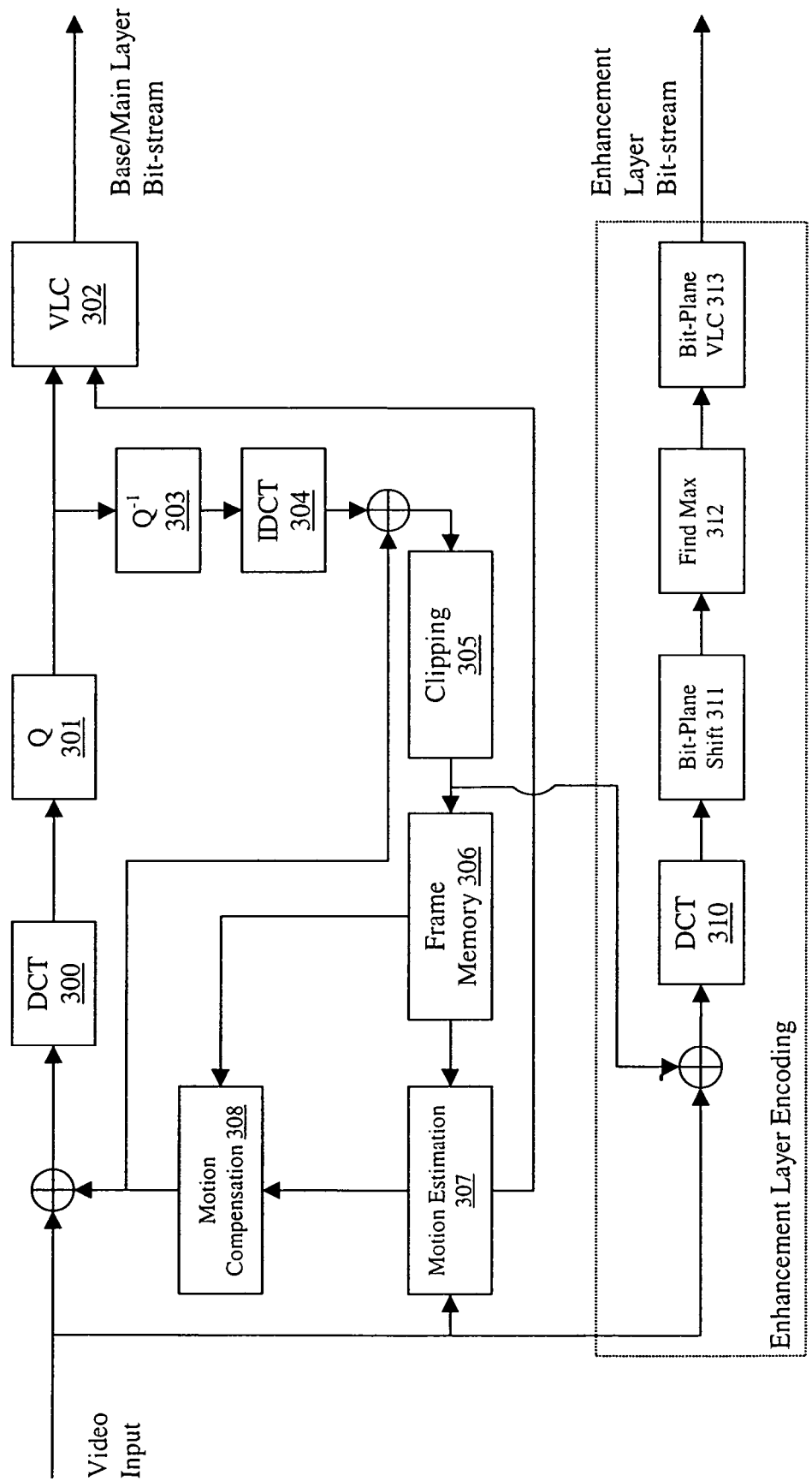
Figure 3B:
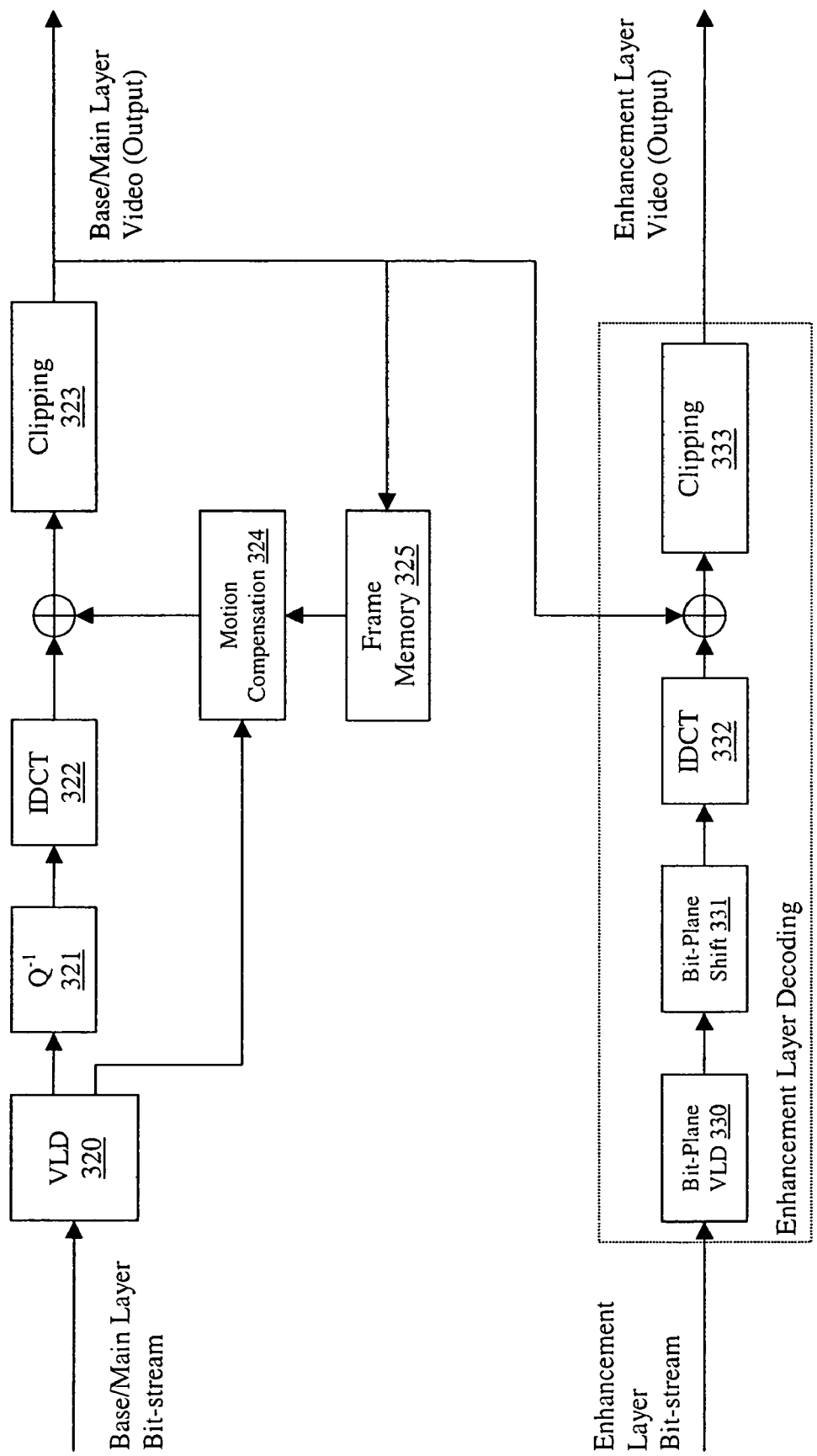
Figure 3C:
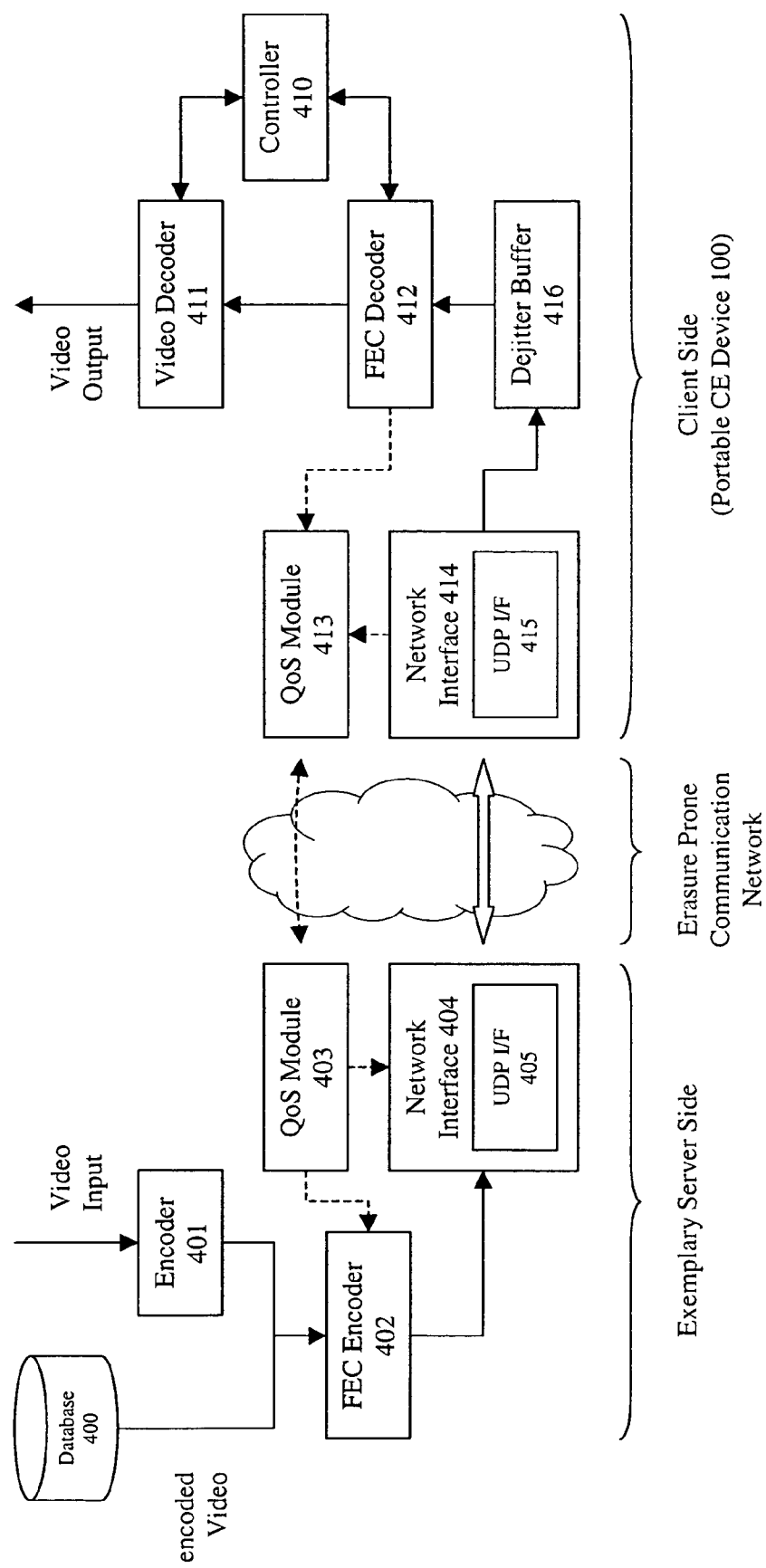
Figure 4A:
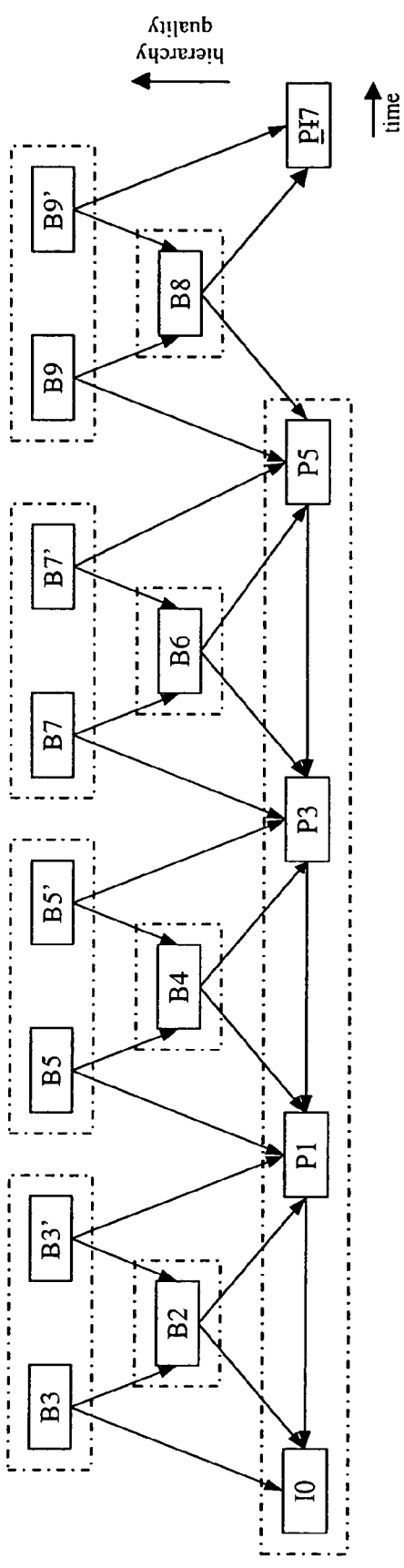
Figure 4B:
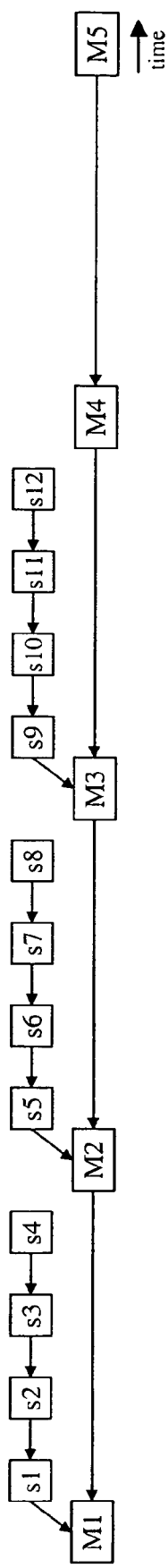

| | |
|---|---|
| FIG. 1 | shows a block diagram depicting components of an exemplary portable CE device according to embodiment of the present invention; |
| FIG. 2 | shows an example of a 4-layer sub-sequence structure of a digital video sequence according to an embodiment of the present invention; |
| FIG. 3a | shows a block diagram depicting components of an exemplary fine granularity scalability (FGS) video encoder according to embodiment of the present invention; |
| FIG. 3b | shows a block diagram depicting components of an exemplary fine granularity scalability (FGS) video decoder according to embodiment of the present invention; |
| FIG. 3c | shows a block diagram depicting components of an exemplary transmitter-network-receiver system according to embodiment of the present invention; |
| FIG. 4a | shows an example of a 3-layer sub-sequence structure of a digital video sequence with frame prediction dependencies according to an embodiment of the present invention; |
| FIG. 4b | shows an example of a 2-layer sub-sequence structure of a digital video sequence with frame prediction dependencies according to an embodiment of the present invention; |
| FIG. 5a | shows a frame sequence in time illustrating frame processing operations according to an embodiment of the present invention; |

-continued

Figure 7A:
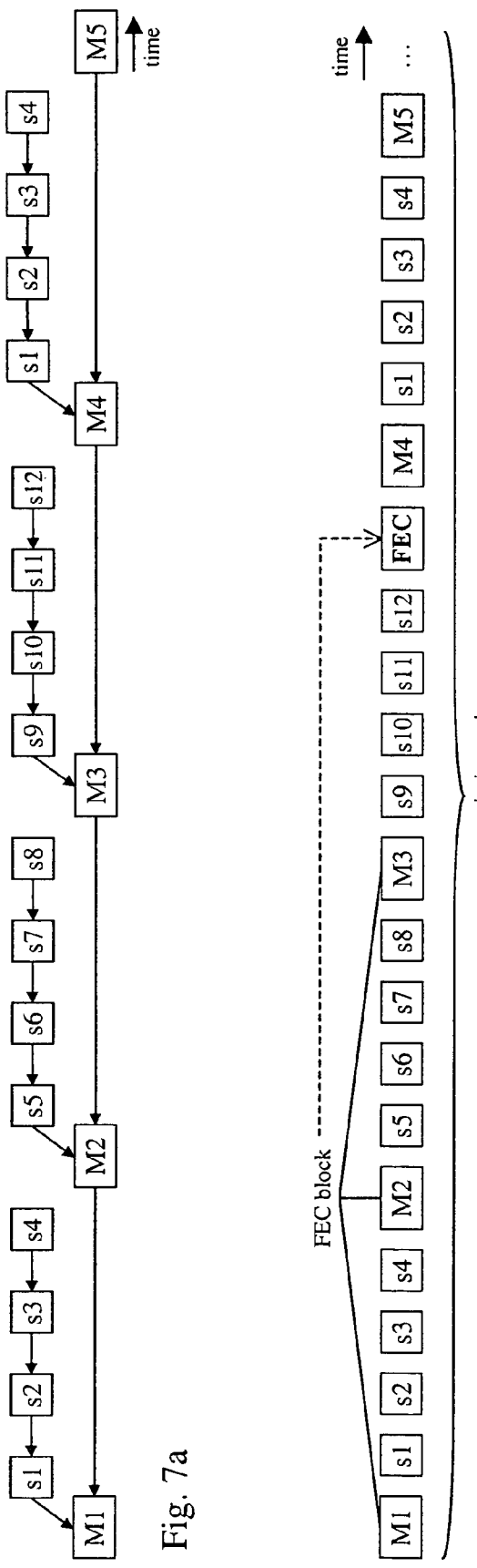
Figure 7B:
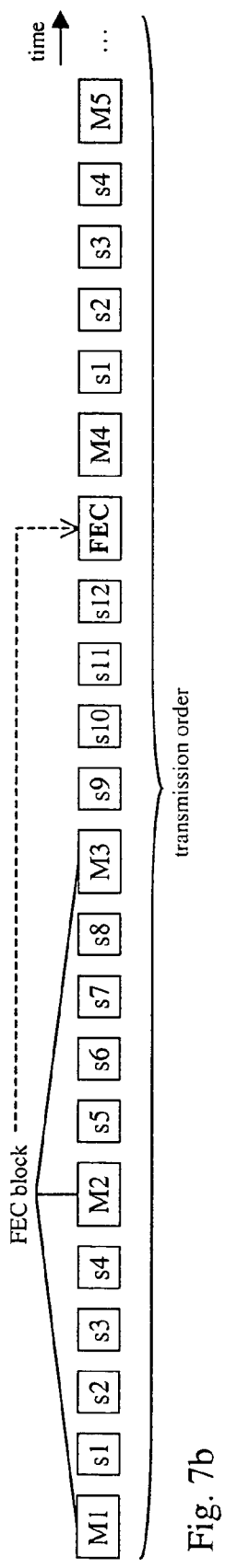
Figure 7C:
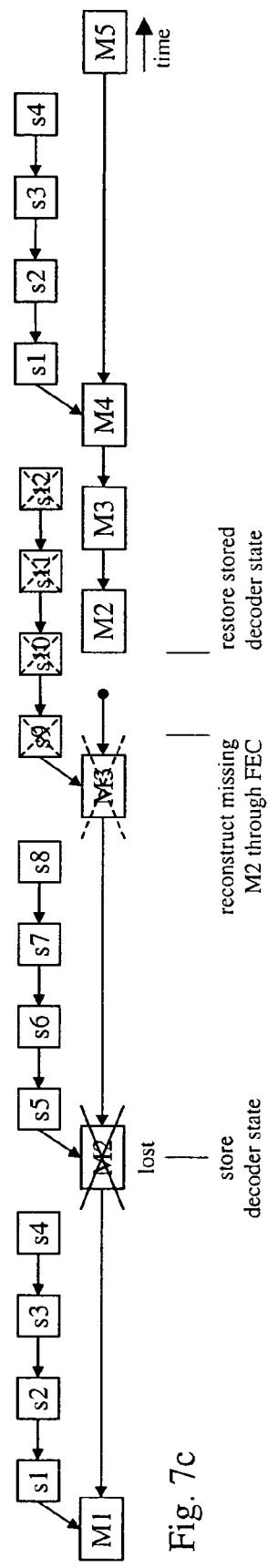
Figures 9A, 9B:
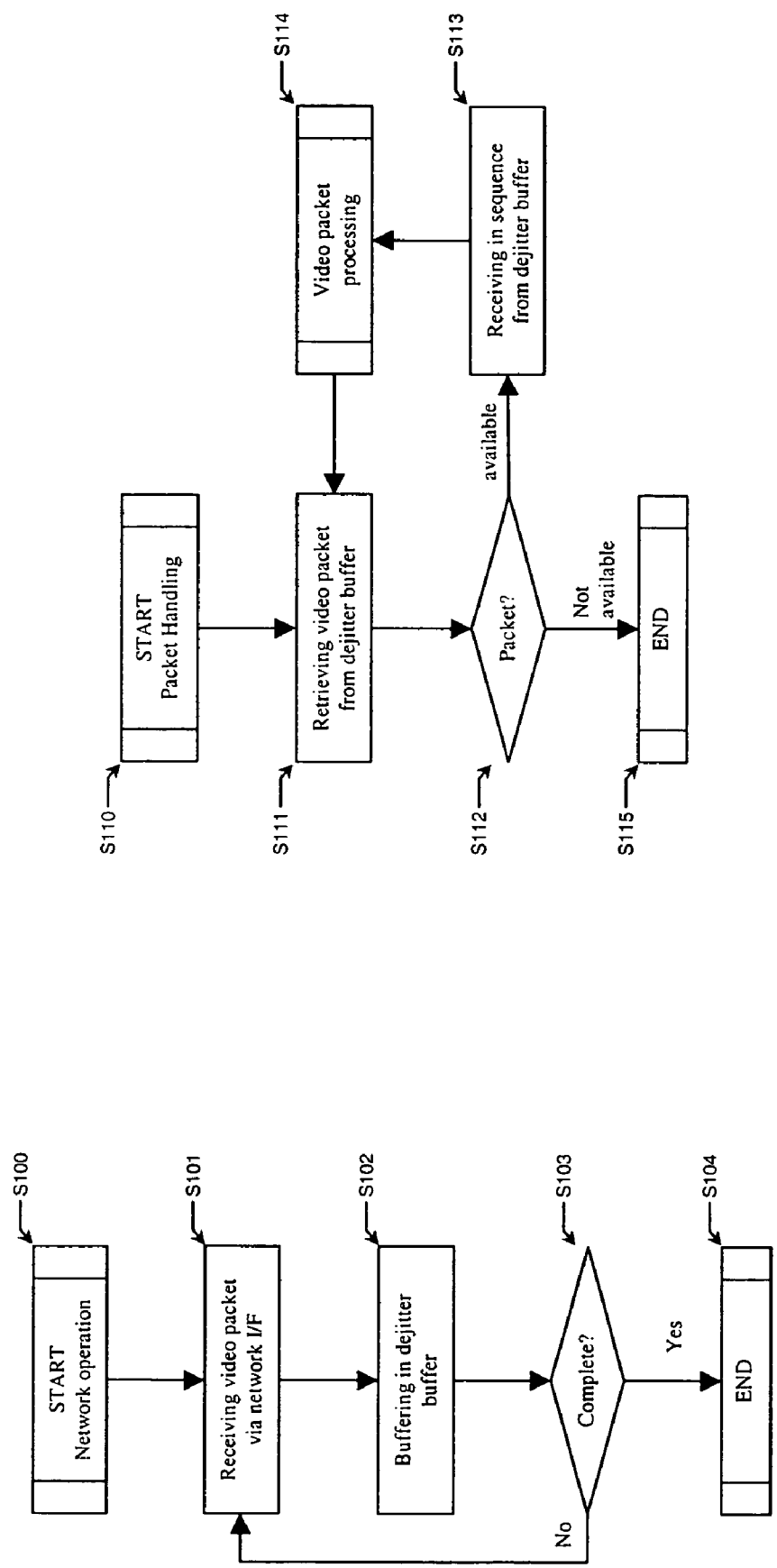
Figure 10A:
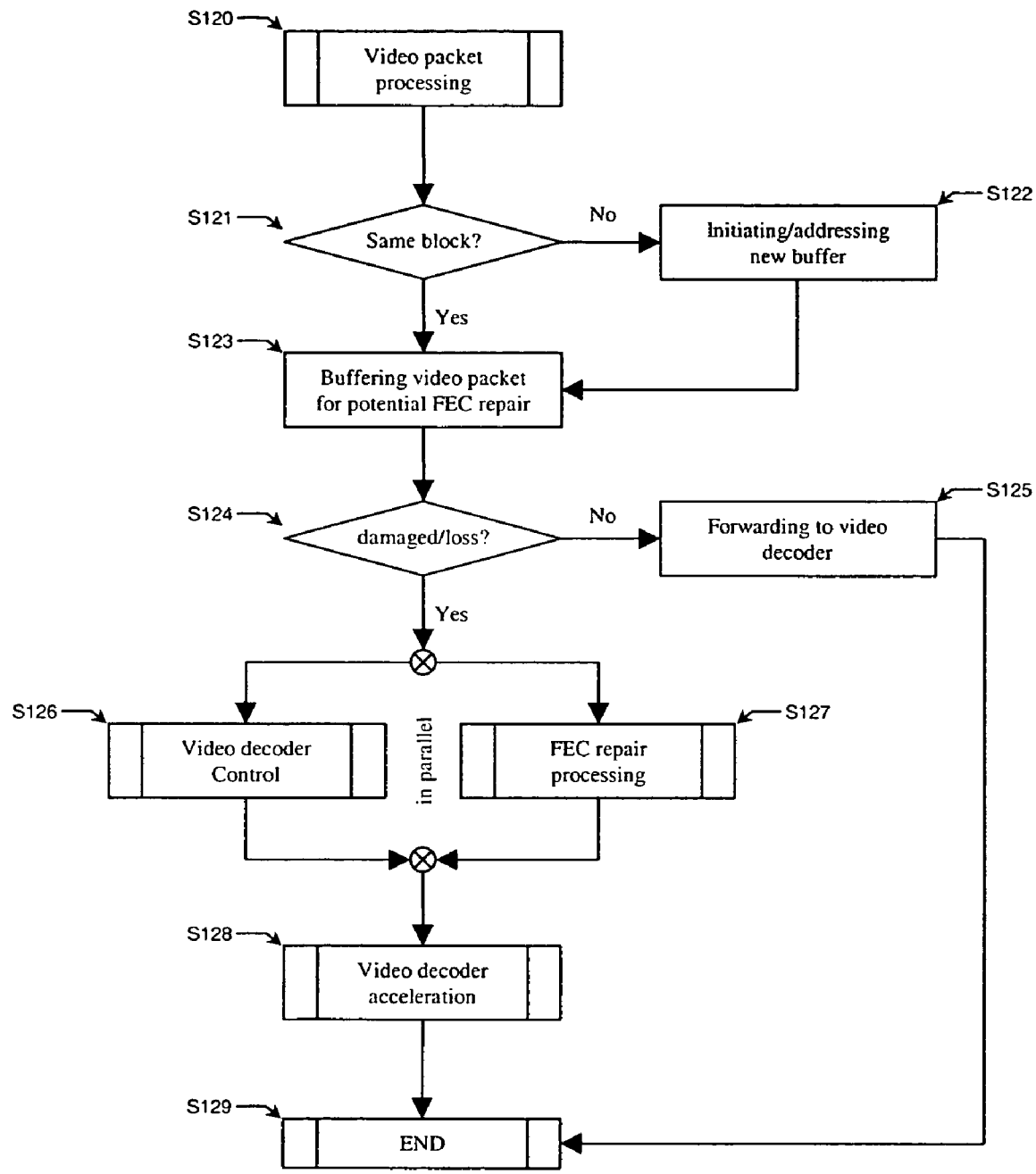
Figure 10B:
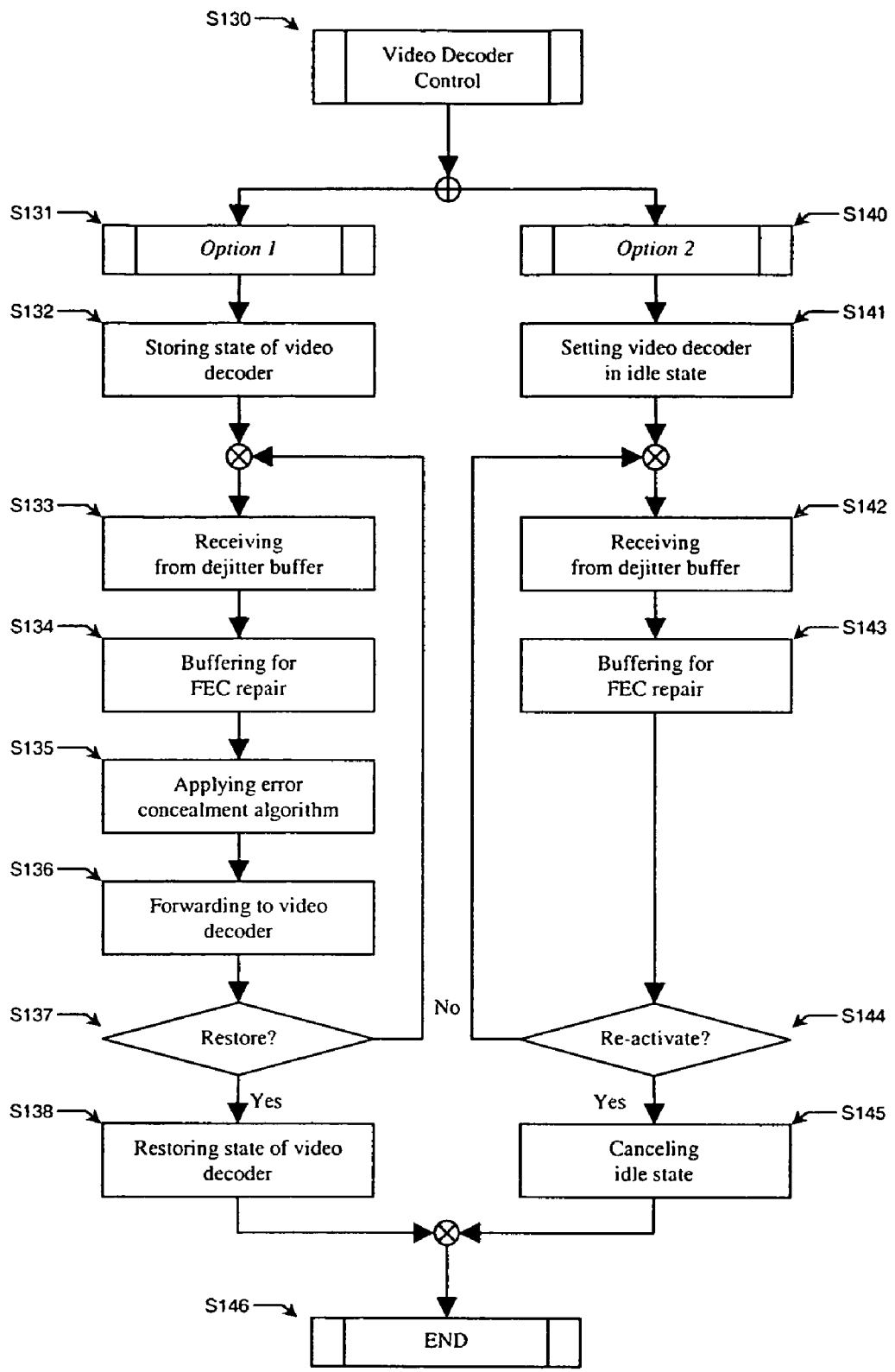

| | |
|---|---|
| FIG. 5b | shows a frame sequence in time illustrating a transmission sequence of video packets on transmitter side according to an embodiment of the present invention; |
| FIG. 6a | shows a frame sequence in time illustrating frame processing operations according to another embodiment of the present invention; |
| FIG. 6b | shows a frame sequence in time illustrating a transmission sequence of video packets on transmitter side according to an embodiment of the present invention; |
| FIG. 7a | shows an example of a 2-layer sub-sequence structure of a digital video sequence with frame prediction dependencies according to another embodiment of the present invention; |
| FIG. 7b | shows a frame sequence in time illustrating a transmission sequence of video packets on transmitter side according to an embodiment of the present invention; |
| FIG. 7c | shows a frame sequence in time illustrating frame processing operations according to another embodiment of the present invention; |
| FIG. 8a | shows an example of a 2-layer sub-sequence structure of a digital video sequence with frame prediction dependencies according to another embodiment of the present invention; |
| FIG. 8b | shows a frame sequence in time illustrating a transmission sequence of video packets on transmitter side according to an embodiment of the present invention; |
| FIG. 8c | shows a frame sequence in time illustrating frame processing operations according to another embodiment of the present invention; |
| FIG. 9a | shows a block diagram illustrating a first overall operational sequence according to another embodiment of the present invention; |
| FIG. 9b | shows a block diagram illustrating a second overall operational sequence according to another embodiment of the present invention; |
| FIG. 10a | shows a block diagram illustrating an operational sequence of a first sub-process according to another embodiment of the present invention; |
| FIG. 10b | shows a block diagram illustrating an operational sequence of a second sub-process according to another embodiment of the present invention; |
| FIG. 10c | shows a block diagram illustrating an operational sequence of a third sub-process according to another embodiment of the present invention; and |
| FIG. 10d | shows a block diagram illustrating an operational sequence of a fourth sub-process according to another embodiment of the present invention. |

DETAILED DESCRIPTION OF THE INVENTION

Features and advantages according to the aspects of the invention will become apparent from the following detailed description, taken together with the drawings. It should be noted that same and like components throughout the drawings are indicated with the same reference number.

The block diagram of FIG. 1 illustrates principle structural components of a portable consumer electronic (CE) device 100, which should exemplarily represent any kind of portable consumer electronic (CE) device employable with the present invention. It should be understood that the present invention is neither limited to the illustrated CE device 100 nor to any other specific kind of portable CE device.

The illustrated portable CE device 100 is exemplarily carried out as cellular communication enabled portable user terminal. In particular, the device 100 is embodied as a processor-based or micro-controller based device comprising a central processing unit (CPU) and a mobile processing unit (MPU) 110, respectively, a data storage 120, an application storage 130, cellular communication means including cellular radio frequency interface (I/F) 180 with radio frequency antenna (not shown) and subscriber identification module (SIM) 170, user interface input/output means including typically audio input/output (I/O) means 140 (typically microphone and loudspeaker), keys, keypad and/or keyboard with key input controller (Ctrl) 150 and a display with display controller (Ctrl) 160, an video decoder module 411 enabled for encoding compressed digital video sequences (and e.g. also digital pictures) in accordance with one or more video codecs and a forward error correction (FEC) decoder (module) 412 interoperating with the cellular interface 180 and the video decoder (module) 411.

The operation of the CE device 100 is controlled by the central processing unit (CPU)/mobile processing unit (MPU) 110 typically on the basis of an operating system or basic controlling application, which controls the functions, features and functionality of the CE device 100 by offering their usage to the user thereof. The display and display controller (Ctrl) 160 are typically controlled by the central processing unit (CPU) 110 and provides information for the user including especially a (graphical) user interface (UI) allowing the user to make use of the functions, features and functionality of the CE device 100. The keypad and keypad controller (Ctrl) 150 are provided to enable the user inputting information. The information input via the keypad is conventionally supplied by the keypad controller (Ctrl) to the processing unit (CPU/MPU) 110, which may be instructed and/or controlled in accordance with the input information. The audio input/output (I/O) means 140 includes at least a speaker for reproducing an audio signal and a microphone for recording an audio signal. The processing unit (CPU/MPU) 110 can control conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry e.g. implemented on the basis of a digital signal processor (DSP, not shown).

The portable CE device 100 according to a specific embodiment illustrated in FIG. 1a includes the cellular interface (I/F) 180 coupled to the radio frequency antenna (not shown) and is operable with the subscriber identification module (SIM) 170. The cellular interface (I/F) 180 is arranged as a cellular transceiver to receive signals from the cellular antenna, decodes the signals, demodulates them and also reduces them to the base band frequency. The cellular interface 180 provides for an over-the-air interface, which serves in conjunction with the subscriber identification module (SIM) 170 for cellular communications with a corresponding base station (BS) of a radio access network (RAN) of a public land mobile network (PLMN). The output of the cellular interface (I/F) 180 thus consists of a stream of data that may require further processing by the processing unit (CPU/MPU) 110. The cellular interface (I/F) 180 arranged as a cellular transceiver is also adapted to receive data from the processing unit (CPU/MPU) 110, which is to be transmitted via the over-the-air interface to the base station (BS) of the radio access network (RAN). Therefore, the cellular interface (I/F) 180 encodes, modulates and up converts the data embodying signals to the radio frequency, which is to be used for over-the-air transmissions. The antenna (not shown) of the CE device 100 then transmits the resulting radio frequency signals to the corresponding base station (BS) of the radio access network (RAN) of the public land mobile network (PLMN). the cellular interface preferably supports a $2^{nd}$ generation digital cellular network such as GSM (Global System for Mobile Communications) which may be enabled for GPRS (General Packet Radio Service) and/or EDGE (Enhanced Data for GSM Evolution), UMTS (Universal Mobile Telecommunications System), or any similar or related standard for cellular telephony standard.

Further, one or more network interfaces in addition to or as an alternative of the above described cellular interface 180 may be implemented in the exemplary portable CE device 100. A large number of wireless network communication standards are today available. For instance, the portable CE device 100 may include one or more wireless network interfaces operating in accordance with any IEEE 802.xx standard, Wi-Fi standard, any Bluetooth standard (1.0, 1.1, 1.2, 2.0 ER), ZigBee (for wireless personal area networks (WPANs)), infra-red Data Access (IRDA), any other currently available standards and/or any future wireless data communication standards such as UWB (Ultra-Wideband). Moreover, the network interface implemented in the exemplary portable CE device 100 may (also) support wired networks such as Ethernet LAN (Local Area Network), PSTN (Public Switched Telephone Network), DSL (Digital Subscriber Line), and/or other current available and future standards.

The components and modules illustrated in FIG. 1 may be integrated in the portable CE device 100 as separate, individual modules, or in any combination thereof. Preferably, one or more components and modules of the portable CE device 100 may be integrated with the central/mobile processing unit (CPU/MPU) forming a system on a chip (SoC). Such system on a chip (SoC) integrates preferably all components of a computer system into a single chip. A SoC may contain digital, analog, mixed-signal, and also often radio-frequency functions. A typical application is in the area of embedded systems and portable systems, which are constricted especially to size and power consumption constraints. Such a typical SoC consists of a number of integrated circuits that perform different tasks. These may include one or more components comprising microprocessor (CPU/MPU), memory (RAM: random access memory, ROM: read-only memory), one or more UARTs (universal asynchronous receiver-transmitter), one or more serial/parallel/network ports, DMA (direct memory access) controller chips, GPU (graphic processing unit), DSP (digital signal processor) etc. The recent improvements in semiconductor technology have allowed VLSI (Very-Large-Scale Integration) integrated circuits to grow in complexity, making it possible to integrate all components of a system in a single chip.

The error recovery module 412 is adapted to detect erroneous data in data packets or missing data packets from a stream of data packets. The data packets are received via the cellular interface 180 or any other network interface such as one of the above described interfaces preferably via a packet-based data network. The error recovery module is further adapted to reconstruct erroneous or missing data. Therefore, a stream of data packets includes redundancy information on the basis of which an error recovery mechanism or algorithm is able to reconstruct the erroneous or missing data such that a re-transmission of data packets, which contain erroneous data, or even a re-transmission of a lost data packet is not necessary.

One typical error recovery mechanism, implementing the above described functionality, is forward error correction, which is accomplished by adding redundancy to the transmitted information using a predetermined algorithm. Each redundant bit is invariably a complex function of many original information bits. The original information may or may not appear in the encoded output. The inventive concept of the present invention will be described with reference to forward error correction technology. The implementation of forward error correction (FEC) is known in the art and details thereabout are out of the scope of the present invention. Nevertheless, it should be noted that the present invention, although described with reference to FEC, is not limited thereto.

The video decoder 411 is adapted to receive a digitally coded video sequence, preferably divided into a plurality of video data packets received via the cellular interface 180 or any other network interface of the portable CE device 100 over a packet-based data communication network connected to via the interface. The video data packets are decoded by the video decoder and preferably outputted to be displayed via the display controller and display 150 to a user of the portable CE device 100. Details about the function and implementation of the video decoder 411 are described in the following.

Typical alternative portable CE devices may include personal digital assistants (PDAs), hand-held computers, notebooks, so-called smart phones (cellular phone with improved computational and storage capacity allowing for carrying out one or more sophisticated and complex applications), which devices are equipped with one or more network interfaces enabling reception of digital video sequences and video decoder for reproducing the video sequence on the display of the device and/or any externally connected display. The implementation of such typical micro-processor based CE devices capable for multimedia data reproduction (especially video reproduction) is well known in the art, and implementation details are out of the scope of the present invention.

Scalability of bit-streams has been early introduced into video coding standards, for instance H.263 Annex O and MPEG-2, and in the following years many forms of layered video coding algorithms. In the following, a number of known types of video bit-stream scalability will be described in brief. Bit-rate scalability refers to the ability of a compressed sequence to be decoded at different data rates. Such a compressed sequence can be streamed over channels with different bandwidths and can be decoded and played back in real-time at different receiving terminals. Scalable multi-media are typically ordered into hierarchical layers of data. A base layer contains an individual representation of a multi-media clip such as a video sequence and a predefined number of enhancement layers contain refinement data in addition to the base layer. The quality of the multi-media clip progressively improves as enhancement layers are added to the base layer. Due to the layered structure of the bit-stream and decoder output, scalable coding is also known as layered coding. Video scalability is often categorized to the following types: temporal, spatial, quality, and region-of-interest. For all types of scalability, the decoding complexity (typically in terms of computation cycles) is an increasing function of the number of enhancement layers. Therefore, all types of scalability also provide computational scalability. The present invention can utilize any type of scalability. It should be noted that the present invention is particularly suitable to be used in conjunction with temporal scalability and sub-sequences and fine granularity quality scalability. The base layer is an independent video bit-stream; i.e. a reconstruction of the bit-stream representing the base layer yields a meaningful video representation. Reconstructing the enhancement layer(s) require(s) an (unimpaired) base layer for reconstruction. The reconstruction of the bit-streams representing the base layer and the enhancement layer(s) result in a video representation with improved frame/rate, quality, and/or resolution. Hence the loss or damage of base layer data is critical for the reconstruction of both the base layer and enhancement layer(s). In contrast, any losses or damages of enhancement layer data do not impair the base layer. Keeping the base layer intact, even at the cost of losses in the enhancement layer, hence is a good strategy for a layered video transmission design. A meaningful video representation is still possible even though with a deteriorate frame/rate, quality, and/or resolution in comparison with the video reconstruction on the basis of the base and enhancement layer(s).

Temporal scalability refers to the ability of a compressed sequence to be decoded at different picture rates. For example, a temporally scalable coded stream may be decoded at 30 Hz, 15 Hz, and 7.5 Hz picture rate. There are two types of temporal scalability: non-hierarchical and hierarchical. In non-hierarchical temporally scalability, certain coded pictures are not used as prediction references for motion compensation (a.k.a. inter prediction) or any other decoding process for any other coded pictures. These pictures are referred to as non-reference pictures in modern coding standards, such as H.264/AVC (Advanced Video Coding). Non-reference pictures may be inter-predicted from previous pictures in output order or both from previous and succeeding pictures in output order. Furthermore, each prediction block in the inter prediction may originate from one picture or, in bi-predictive coding, may be a weighted average of two source blocks. In conventional video coding standards, B-pictures provided means for temporal scalability. B-pictures are bi-predicted non-reference pictures, coded both from the previous and the succeeding reference picture in output order. Among other things, non-reference pictures are used to enhance perceived image quality by increasing the picture display rate. They can be dropped without affecting the decoding of subsequent frames, thus enabling a video sequence to be decoded at different rates according to bandwidth constraints of the transmission network, or different decoder capabilities. Whilst non-reference pictures may improve compression performance compared to reference pictures, their use requires increased memory as well as introducing additional delays.

In hierarchical temporal scalability, a certain set of reference and non-reference pictures can be dropped from the coded bit-stream without affecting the decoding of the remaining bit-stream. Hierarchical temporal scalability requires multiple reference pictures for motion compensation, i.e. there is a reference picture buffer containing multiple decoded pictures from which an encoder can select a reference picture for inter prediction. In H.264/AVC coding standard, a feature called sub-sequences enables hierarchical temporal scalability as described in the following. Each enhancement layer contains sub-sequences and each sub-sequence contains a number of reference and/or non-reference pictures. A sub-sequence consists of a number of inter-dependent pictures that can be disposed without any disturbance to any other sub-sequence in any lower sub-sequence layer. Sub-sequence layers are hierarchically arranged based on their dependency on each other. When a sub-sequence in the highest enhancement layer is disposed, the remaining bit-stream remains valid. Sub-sequences are discussed in more details in the following sub-section.

Spatial scalability allows for the creation of multi-resolution bit-streams to meet varying display requirements/constraints. In spatial scalability, one or more spatial enhancement layer(s) are used to recover the coding loss between an up-sampled version(s) of the re-constructed layer(s) used as reference(s) by the enhancement layer(s), that is the reference layer, and higher resolution version(s) of the original picture. For example, if a reference layer has a Quarter Common Intermediate Format (QCIF) resolution (i.e. 176×144 pixels) and an enhancement layer has a Common Intermediate Format (CIF) resolution (i.e. 352×288 pixels), the reference layer picture must be scaled accordingly such that the enhancement layer picture can be appropriately predicted from it. There can be multiple enhancement layers, each increasing picture resolution over that of the previous (enhancement) layer.

Quality scalability is also known as Signal-to-Noise Ratio (SNR) scalability. The quality scalability allows for the recovery of coding errors, or differences, between an original picture and its re-construction. This is achieved by using a finer quantizer to encode the difference picture in one or more enhancement layer(s). This additional information increases the SNR of the overall reproduced picture. Quality scalable video coding techniques are often classified further to coarse granularity scalability and fine granularity scalability (FGS). In coarse granularity scalability, all the coded data corresponding to a layer (within any two random access pictures for that layer) are required for correct decoding. Any disposal of coded bits of a layer may lead to an uncontrollable degradation of the picture quality. Coarse quality scalability methods are often referred to as leaky prediction in which the quality degradation caused by disposal of coded data from a layer is guaranteed to decay. In fine granularity scalability (FGS), the resulting decoding quality is an increasing function of the number of bits decoded from the highest enhancement layer. In other words, each additional decoded bit improves the quality. An example of an FGS coding scheme is described below with reference to FIG. 2. In fine granularity scalability (FGS) all enhancement layers in prediction frames are typically coded based on the base layer in the reference frames. Thus, missing data or transmission errors in a coded fine granularity scalability (FGS) picture in an enhancement layer do not cause any degradation in the subsequent pictures. There exist also methods, which combine coarse and fine granularity scalability and reach intermediate levels in terms of the number of scalability steps.

In region-of-interest scalability, the quality or resolution improvement is not uniform for an entire picture area, but rather only certain areas within a picture are improved by the utilization of the one or more enhancement layers.

With reference to the block diagram of FIG. 3*a*, an example Discrete Cosine Transform (DCT) Fine Granularity Scalability (FGS) hybrid video encoder, such as used for MPEG video encoding, is schematically depicted. The depicted video encoder supports intra and inter mode video coding; i.e. motion estimation as well as motion prediction is supported to enable the coding of B- and P-frames in inter coding mode.

Intra coding techniques traditionally refer to the fact that the various lossless and lossy compression techniques are performed relative to information that is contained only within the current frame and not relative to any other frame in the video sequence. An intra coded picture contains no references to data outside the intra coded picture (e.g. previous or following pictures). Traditionally, a similar attribute applied to intra macroblocks—they were self-contained entities. In modern video compression standards, however, intra macroblocks can be partly predicted from neighboring intra and inter macroblocks, unless this is explicitly blocked by the encoder (see, for example, the ConstrainedIntraPrediction bit in the H.264 picture parameter set). Hence, intra coding, by itself, does not necessarily possess the independent decoding properties it had in older video compression standards such as ITU-T Rec. H.261.

Independent decoder refresh is a concept of those modern video compression standards that include reference picture selection. When reference picture selection is possible, the error correction aspect of intra is not necessarily valid anymore, as later Inter pictures or macroblocks may refer to reference pictures/macroblocks older than the intra picture/macroblock. To avoid error propagation by importing data from those older pictures, a mechanism known as Independent Decoder refresh (IDR) has been introduced. In ITU-T Rec. H.264, for example, an IDR picture guaranties that all reference picture buffers are invalidated and no reference be made to pictures that has been decoded before the IDR. Although not specified in the standard, encoders can enforce an IDR behavior to macroblocks as well.

When decoding an IDR or Intra picture or macroblock, no temporal processing for this picture is performed outside of the current coded picture or frame. Inter coding techniques are extensions to these IDR and intra coding techniques. The encoder is supplied with a video input which is formed of a sequence of video input frame Fn. These frames are presented for encoding. The basic processing blocks for intra coding include typically video filter (not shown), discrete cosine transformer (DCT) 300, a coefficient quantizer (Q) 301, and an entropy or variable run-length encoder (VLC) 302. These blocks will be described individually below.

Typical video bit-stream resulting from video encoding is structured into a hierarchy of layers to help with error handling, random search and editing, and synchronization. From the top level, a first layer is known as the sequence layer, and is any self-contained bit-stream, for example a coded movie. A second layer down is the group of video frames, which is composed of one or more groups of a combination of IDR, intra (I), inter (P and/or B) frames. The exact nature of this combination is constrained by the video compression standard, and the profile/level used in this standard, and chosen by the encoder. A third layer down is the frame layer itself, and the next layer beneath it is typically called the slice layer. In most older video compression standards, each slice is a contiguous sequence of raster ordered macro-blocks (MB), most often on a row basis in typical video applications. Each slice consists of macro-blocks (MB), which are for example formed of 16×16 arrays of luminance pixels with 2 8×8 arrays of associated chrominance pixels. The macro-blocks (MB) can be further divided into distinct 8×8 blocks, for further processing such as transform coding.

Typical video coding techniques uses typically the YCbCr color space for presentation, where Y is the luminance signal, Cb is the blue color difference signal, and Cr is the red color difference signal. Research into the Human Visual System (HVS) has shown that the human eye is most sensitive to changes in luminance, and less sensitive to variations in chrominance. Hence, the use of YCbCr color space makes it possible to present chrominance and luminance information taking account the capabilities of a human eye. If required, the video filter (not shown) transforms therefore the inputted video picture sequence from RGB color space into YCbCr color space The frames are supplied to the discrete cosine transformer (DCT) 300 in units of a macro-block (MB) as briefly described above. The discrete cosine transformer (DCT) 300 operates the Discrete Cosine Transform (DCT), or a comparable transform, with similar characteristics[WS1]. Neighboring pixels within an image frame tend to be highly correlated especially in two-dimensional video sequences. The Discrete Cosine Transform (DCT) represents a near optimal transform in energy concentration and de-correlating for a large class of images. The discrete cosine transformer (DCT) 300 decomposes the supplied signal into underlying spatial frequencies, which then allow further processing techniques to reduce the precision of the resulting Discrete Cosine Transform (DCT) coefficients consistent with an adequate Human Visual System (HVS) model. The lower frequency Discrete Cosine Transform (DCT) coefficients correspond to smoother spatial contours, while the DC coefficient (a coefficient of the Discrete Cosine Transform) corresponds to a solid luminance or color value for the entire block. The higher frequency Discrete Cosine Transform (DCT) coefficients correspond to finer spatial patterns, or even noise within the image. Due to the circumstance that the Human Visual System (HVS) is less sensitive to errors in high frequency coefficients than in lower frequencies, advantage of the unbalanced sensitivity is taken by quantizing the higher frequencies more coarsely in their representation.

The quantizer (Q) 301 operates on the quantization of the Discrete Cosine Transform (DCT) coefficients on the basis of the different sensitivities of the Human Visual System (HVS) as briefly described above. Details of the quantization operation are out of the scope of the present invention. The goal of the quantization operation is to force as many of the Discrete Cosine Transform (DCT) coefficients to zero, or near zero, as possible within the boundaries of the predefined bit-rate and video quality parameters.

After Discrete Cosine Transform (DCT) and Quantization (Q), most of the energy is concentrated within the lower frequency portion of the matrix, and most of the higher frequency coefficients have been quantized to zero. Considerable savings can be achieved by coding zero coefficients in an effective manner. Therefore, the matrix is scanned in typically in zigzag pattern in order to improve the possibility of achieving long sequences of consecutive zero coefficients and applying variable length encoding (VLC). Likewise, alternative entropy encoding methodologies are applicable, especially arithmetic encoding. The scanning and coding operation is performed by the Variable Length Encoder (VLC) 302.

The temporal prediction technique used in video coding is conventionally based on motion estimation. Consecutive video frames are often similar except for changes resulting from object movements within video frames or in-between consecutive video frames. Motion estimation is employed to take advantage in video coding of such similar consecutive video frames. In trivial case, where motion between consecutive video frames is present a current frame can be simply predicted as a duplicate of the previous frame. This means, the only information necessary to transmit to the decoder is to instruct to reconstruct the frame from the previous reference frame.

In older video compression standards, the temporal prediction technique allows typically forward and backward prediction, i.e. prediction of a future frame on the basis of one or more previous frames as well as interpolation prediction on the basis previous and subsequent frames. The video encoder can forward predict a future frame referred to as a P frame. Moreover, video encoder can also forward predict a P frame on the basis of a previous P frame. This means, a current P frame in a sequence is predicted from the any type of frame immediately preceding the current P frame, whether preceding frame is an I frame and a P frame, respectively. The encoder likewise is enabled of using forward/backward interpolated prediction. Such frames are commonly referred to as bi-directional interpolated prediction frames or B frames. This means, B frames are coded based on a forward prediction from a previous I or P frame, as well as a backward prediction from a succeeding I or P frame. The main advantage of the usage of B frames is coding efficiency conventionally at the cost of quality.

In modern video compression standards, such as ITU-T Rec. H.264, the prediction relationships are relaxed and generalized, and generally be executed on a macroblock level. An intra macroblock references only data of the same picture. P macroblocks reference for prediction data from a single other picture, which may be located (in the temporal domain) in the future or in the past. Bi-predicted macroblocks may reference up to two pictures, either of which may be located in the future or in the past. B-slices may contain I, P, or B macroblocks. P slices may contain only I or P macroblocks, and I slices contain exclusively I macroblocks. H.264 does not have a picture type concept per se, hence all slice types allowed by the profile in use may be mixed freely. The single exception to this rule is an IDR picture, which contains only Intra slices and intra macroblocks, and has, in addition, the property of invalidating all previous reference picture buffers and hence disallowing the reference to pictures being decoded earlier than the IDR picture.

To enable temporal prediction technique it is necessary to provide the current encoded video frame for motion estimation of the succeeding video frame. The current encoded video frame is provided by decoding, which is herein operated by a De-quantizer or Inverse Quantizer ($Q^{-1}$) 303 tapping the signal or bit-stream between Quantizer (Q) 301 and Variable Length Encoder (VLC) 302 and inverse transforming by an Inverse Discrete Cosine Transform (IDCT) 304, which supplies the decoded video frame finally to a frame memory 305 or frame buffer. The frame memory 306 provides the decoded video frame as reference video frame to the motion estimation 307. Modern video compression schemes may include more than one reference video frame buffers that are addressed using reference picture selection. The motion estimation 307 is now able to make a decision on a next frame to be coded either as inter-frame or intra-frame at frame level. In case of inter-frame coding, the motion estimation (307) and motion compensation (308) are performed on the video frame input in order to remove temporal redundancy. The motion estimation (307) involves finding motion vectors for each block, which has been moved in comparison with the reference video frame(s). After prediction, Discrete Cosine Transform (DCT) is applied on prediction errors to remove spatial correlation. Quantization (Q) is the only loss function to remove psycho-visual redundancy in the coding process. Then quantized DCT coefficients are sent to the Variable length Encoder (VLC) 302 to form final bit-stream using entropy coding. After the current frame has been processed, Inverse Quantization ($Q^{-1}$) together with Inverse Discrete Cosine Transform (IDCT) is performed to reconstruct the coded frame for future reference.

A rate-control (not shown) function adjusts the output to a preferably predefined bit rate. This involves typically counting the number of encoded bits and calculating the quantizer scale for feedback control. A clipping function (305) may be employed for clipping the decoded video frame before storing as reference video frame in the frame memory 306.

The modules described above represent Discrete Cosine Transform (DCT) video encoder, such as used for MPEG video encoding, which outputs a base layer bit-stream. Fine Granularity Scalability (FGS) of the video encoder depicted in FIG. 3a is achieved by the Enhanced Layer Encoding function, which enables improved decoding quality by the means of the provision of an enhancement layer bit-stream.

The Enhanced Layer Encoding function is supplied with a spatial difference video frame formed of the current video frame to be encoded and reconstructed decoded frame resulting from the Inverse Quantizer ($Q^{-1}$) 303 in combination with the Inverse Discrete Cosine Transformer (IDCT) 304. The spatial difference video frame generated is dominated by finer spatial patterns present in the spatial video frame because the encoding mechanism described above and especially the Quantizer (Q) is adapted to focus on smoother spatial contours corresponding to lower frequency Discrete Cosine Transform (DCT) coefficients. The Discrete Cosine Transform (DCT) coefficients of the difference frame are processed with the help of a Discrete Cosine Transform (DCT) 310.

Then a shifting operation can be applied on the Discrete Cosine Transform (DCT) coefficients by the means of the bit-plane shift function 311 enabling selective enhancement and a find maximum function 312 allows additional for frequency weighting. Finally bit-plane extraction and variable length encoding is performed by the function 313 resulting in the enhancement layer bit-stream output. With reference to the block diagram of FIG. 3b, an example Discrete Cosine Transform (DCT) Fine Granularity Scalability (FGS) hybrid video decoder, such as used for MPEG video decoding, is schematically depicted. The depicted video decoder supports intra and inter mode video decoding; i.e. motion compensation is supported to enable the decoding of B- and P-frames in inter decoding mode.

The base layer bit-stream is supplied to a Variable Length Decoder (VLD) 320, which entropy decodes the received bit-stream frame-wise. Depending whether the current processed frame is an intra or inter frame, the quantized Discrete Cosine Transform (DCT) coefficients are supplied to an Inverse Quantized ($Q^{-1}$) 321 or a motion compensation function 324. In case of an intra frame, the Inverse Quantized ($Q^{-1}$) 321 de-quantizes the Discrete Cosine Transform (DCT) coefficients and a following Inverse Discrete Cosine Transform (IDCT) reconstructs finally the encoded spatial video frame. The encoded spatial video frame can be furthermore clipped by the means of the clipping function 323 before outputted for being displayed. The finally encoded spatial video frame is likewise supplied to a frame memory 325 to enable inter frame processing, where the buffered frame in the frame memory 325 serves as reference frame. In case of an inter (P and/or B) frame, the decoded bit-stream is supplied to the motion compensation function 324, which predicts the spatial video frame for being outputted by the video decoder on the basis of a reference frame stored in the frame memory 325 and the decoded bit-stream received from the Variable Length Decoder (VLD) 320. The reconstructed frame resulting from the motion compensation function 324 is then supplied to the clipping function 323 for optional clipping before outputted by the video decoder for being displayed. The output reconstructed from the base layer bit-stream as described above forms the base layer video output.

In order to take advantages of the enhancement layer bit-stream the information comprised by the base layer bit-stream as well as the enhancement layer bit-stream has to be combined. This combination results in a separate enhancement layer video output providing reconstructed spatial video frames with an improved quality in comparison with those provided via the base layer video output. The enhancement layer bit-stream is supplied to a bit-plane and variable length decoder (VLD) 330. Afterwards, a bit-plane shift function 331 serves to return the shift operation applied during encoding resulting in quantized Discrete Cosine Transform (DCT) coefficients, which are transformed into spatial coefficients of a video frame by the means of an Inverse Discrete Cosine Transformer (IDCT) 332. The resulting video frame is combined with the spatial video frame reconstructed from the base layer bit-stream, which is the inverse operation of the difference frame forming operated during encoding. The resulting combined spatial video frame can be also clipped by the means of a clipping function 333 before outputted via the enhancement layer video output for being displayed.

Sub-sequences can be implemented using modern video compression standards that allow reference picture selection, such as the ITU-T Recommendation H.264. With reference to FIG. 4a, a general example is depicted to illustrate the hierarchical layer concept. The depiction of FIG. 4a shows an example, where coded pictures/frames are categorized into three layers. Solid-lined boxes indicate frames, letters in the boxes indicate the frame type (where B indicates a bi-directional interpolated prediction frame and P indicates a forward prediction frame), and number in the boxes indicate frame numbers. Dashed-lined boxes encompass sequences each comprising one or more frames. The vertical alignment of the boxes indicates the sequence layer, which the coded picture/frame belongs to and the arrows connecting the boxes indicate prediction dependencies. The display sequence of the frames in time is indicated by the horizontal alignment of the boxes from left to right. With back reference to FIG. 2, the frame sequence I0, P1, P3, P5, and I7 forms the base/main layer, whereas the frame sequence B2, B4, B6, and B8 can be assigned to the $1^{st}$ layer of the enhancement layer and the remaining frames can be assigned to the $2^{nd}$ layer thereof in accordance with the logical hierarchy. A layer selective decoding enables to achieve frame rates equal to ¼, ½, and 1 of a predefined decoder frame rate, when only the base/main layer is decoded, the base/main layer and the $1^{st}$ enhancement layer are decoded and all three layers are decoded, respectively. Alternatively, the frames depicted may be organized logically into two layers, a base/main layer comprising the frames I0, P1, P3, P5 and I7 and one enhancement layer comprising all remaining non-reference frames. In this case, a layer selective decoding enables to achieve frame rates equal to ¼ or 1 of a predefined decoder frame rate, when only the base/main layer is decoded, the base/main layer and the (only) enhancement layer are decoded, respectively.

For the sake of simplicity of the further discussion, we restrict ourselves here to a two-layer scalability scheme employing a base layer and one enhancement layer. Moreover, to enable identification of the belonging to either the base layer or the enhancement layer, the frame of the main layer will be indicated by a character "M" (abbreviating "main") and a sequence number, while the frames of the enhancement (sub-) sequence will be indicates by a character "s" (abbreviating "sub") and a sequence number. The type of frame can be obtained from the dependency indicating arrows between the boxes indicating the frames. With reference to FIG. 4, main sequence consists of I and P frames M1, M2, M3 at a comparatively low frame rate. The integrity of this prediction chain is essential for the correct reconstruction of all coded frames. Additionally, there are frames in sub-sequences, designated as s1, s2, s3 . . . The arrows indicate which frames are predicted from other frames, i.e. the arrows illustrate prediction relationships.

The frame in the sub-sequence may use other frames in the same sub-sequence and frames of the main sequence for prediction. It should be noted here that the depicted prediction relationship is the simplified example of a general prediction relationship, using only single-frame backward prediction. Modern video compression standards offer much more complex prediction schemes. The present invention is applicable with these complex schemes. Frames of the main sequence predict only from other frames of the main sequence. Also, there is no prediction between frames of more than one sub-sequence.

The inventive concept of the present invention, which is described in detail on the basis of the depicted prediction relationship, will be understood by those in the art and applying the inventive concept to more complex and general prediction relationship will be appreciated as a straight forward application of the inventive concept.

In case a loss or damage of a frame in a sub-sequence occurs (for example due to an erasure), it may result in artifacts in the display of this frame and in those other pictures of the sub-sequence that predict from the damaged frame. However, such an error does not propagate to frames of the main sequence and to frames in preceding sub-sequences depending on following frames of the main sequence. Assuming reasonably short sub sequences (e.g. 5 pictures, or ⅓rd of a second in length at 15 fps—a commonly used frame rate in 3GPP ($3^{rd}$ Generation Partner Project) Packet Switched Conversational (PSC) services), the user experience would be such that an error in a sub-sequence results in a brief period of deteriorated pictures (on average ⅙ of a second in length), followed by a good picture quality for all following frames.

It should be noted that the present inventive concept is not restricted to the two level hierarchy described for the sake of simplicity. Any given sub-sequence of the illustrative two level hierarchy formed of a base layer and a sub-sequence layer may include one or more sub-sub-sequences, and so forth. The practical limit of sub-sequence hierarchies lies in the loss of compression efficiency in the outer sequences (especially the main sequence), where the temporal distance between coded pictures soon becomes too high to meaningfully allow inter frame prediction. For this reason and for the reason of simplicity of the following description of the present invention, the scheme discussed in the following employs only a main sequence and one sub-sequence level.

Video decoders are complex hardware/software systems that reconstruct a bit-stream into a sequence of uncompressed video pictures. An exemplary video decoder is described above with reference to FIG. 3b. The cycle and memory requirements to reconstruct a given bit-stream depends on many factors, such as bit rate, spatial size of the reconstructed pictures, coding tools employed, complexity of the content, and many others. All modern video compression standards contain specifications, which allow a software/hardware designer to make a worst-case analysis of the complexity of a decoder, depending on only a few key parameters often expressed in the combination of a profile and a level. To be conformant with the standard, a decoder must be able to cope even with the most complex bit-streams, and hence conformant decoders are provisioned according to the worst-case analysis mentioned.

In all practical environments, the profile and level (or equivalent information in video compression standards that do not use a profile/level system) is negotiated, announced, hard-coded, or otherwise made known to the decoder before the actual video transmission commences. The video decoder uses this information for resource allocation (memory, cycles, and other resources). On a system level, a receiver may refuse connections to senders when it knows that it does not have the resources available to decode a bit-stream of a certain profile and level.

Assume, a video decoder has learned that it needs to provision for n cycles per second, e.g. through a transmission of a profile and level information. Assume further, the video decoder has to decode a bit-stream m times as fast as negotiated—a technique called accelerated decoding henceforth. Taking, for the sake of simplicity, only processor cycles into account, the video decoder needs to provision for m·n cycles. For example, assume the negotiated profile/level requires the decoding of pictures of 176×144 pixel resolution at 15 frames per second (fps), which may as an example require 10,000,000 cycles per second. If the application requires a decoding speed four times faster (resulting in 60 fps), then the cycle requirements is also four times higher resulting in an exemplary requirement of 40,000,000 cycles per second. It should be noted that "cycle" is used here as a generic term for computational complexity and does not necessarily directly translate to processor/DSP (digital signal processor) cycles, as there are other factors such as memory access penalties that have to be taken into account. In practice, for cost efficiency reasons, a designer of a CE device will usually try to avoid over-provisioning a video decoder implemented in the CE device.

When layered video coding is involved, the above considerations apply for base and enhancement layer independently. However, if base and enhancement layer decoders run quasi-parallel utilizing the same resources (e.g. the same DSP), it is possible to "shift" cycles from the enhancement layer decoding to the base layer decoding if desired.

Forward error correction (FEC) in the sense mentioned above is rarely used in conversational applications. At low bit rates (e.g. typically below 300 kbit/s), normally, no more than two RTP (Real-Time transport Protocol) packets are used per picture so to keep the header-to-payload ratio in an acceptable range. For the following exemplary analysis it should be assumed that a one packet per picture packetization strategy is utilized, while the comparatively small overhead for the FEC repair packet encapsulation is neglected. Furthermore, it is assumed for simplicity that all video packets are of the same size. Under the latter assumption, the FEC repair packet size is the same as the size of the video packet. Note that if video packets were of different size, depending on the FEC scheme employed, the FEC repair packet would often have to be at least the size of the largest video packet. In order to make use of the FEC repair packets in case of an erasure, the repair packet and a sufficient number of media packets must have been received. Hence, utilizing FEC requires the reception of the whole FEC block and all repair packets except of those packets that have been erased by the network. When using an assumed bandwidth-limited communication link over the network, the number of packets of constant size (see assumptions above) directly translates to the delay induced by FEC. All these assumptions lead to a best case FEC overhead and delay properties are as follows:

that is unacceptable to conversational applications, in which the end-to-end delay should be below a predefined threshold.

As mentioned above, in layered coding the base layer is more important for the perceptual quality than the enhancement layer. Hence it is generally advisable to protect the base layer stronger than the enhancement layers.

A transmitter for encoded video utilizes a packet-based transport mechanism, for example IP/UDP/RTP/RFC 3984 (Internet Protocol/User Datagram Protocol/Real-Time transport Protocol) and a video codec utilizing inter-frame prediction, for example H.264, to convey packets to one or more receivers. The Request For Comments (RFC) 3984 is published by the Network Working Group of the Internet Engineering Task Force (IETF), which is part of the Internet Society (ISOC), which coordinates the standardization of communication protocols of Internet Protocol based networks. The RFC 3984 can be obtained from the Internet Engineering Task Force (IETF) and is referenced herewith for inclusion. The H.264 is a video codec recommendation provided by the ITU-T (ITU Telecommunication Standardization Sector of the International Telecommunication Union). The H.264 standard description can be obtained from the International Telecommunication Union (ITU) and is referenced herewith for inclusion. The RFC 3984 describes a Real-Time transport Protocol (RTP) payload format for the ITU-T Recommendation H.264 video codec and the technical identical ISO/IEC (International Organization for Standardization/International Electrotechnical Commission) International Standard 14496-10 video codec.

Each coded frame is conveyed in one or more data packets. Packet-based forward error correction (FEC), e.g. as disclosed in RFC 2733, is employed to protect some or all of these data packets. The RFC 2733 can be obtained from the Internet Engineering Task Force (IETF) and is referenced herewith for inclusion. The RFC 2733 specifies a payload

| | FEC Block Size [number of packets] ($N_{Size}$) | Number of FEC repair packets ($N_{FEC}$) | Total number of packets/block (corresponding to delay) ($N_{Total} = N_{Size} + N_{FEC}$) | Protection against number of erasures | Overhead [percent] |
|---|---|---|---|---|---|
| #1 | 1 | 0 | 1 | no | 0 |
| #2 | 1 | 1 | 2 | 1 | 100 |
| #3 | 2 | 1 | 3 | 1 | 50 |
| #4 | 3 | 1 | 4 | 1 | 33 |
| #5 | 4 | 1 | 5 | 1 | 25 |
| #6 | 4 | 2 | 6 | 2 | 50 |
| #7 | 5 | 1 | 6 | 1 | 20 |
| #8 | 5 | 2 | 7 | 2 | 40 |

In case of a data transmission without protection, i.e. a FEC block with a length of one ($N_{size}=1$), and no repair packets ($N_{FEC}=0$), the overhead is 0% and the transmission delay is the transmission time of one FEC packet ($N_{Total}=1$) corresponding to duration of one frame (see table row #1). In case of a data transmission with three media packets ($N_{size}=3$) along with one FEC repair packet ($N_{FEC}=1$), the overhead is 33% and the delay is four packets ($N_{Total}=4$) corresponding to duration of four frames (see table row #4). In case of a data transmission with five meeting packets ($N_{size}=5$) and with two FEC repair packets ($N_{FEC}=2$), the overhead is 40% and the delay is seven packets ($N_{Total}=7$) corresponding to duration of seven frames (see table row #8), which is almost half a second when assuming a 15 fps video transmission. It should be clear that the use of FEC with a reasonable amount of protection, according to the table above, leads to a delay format for generic forward error correction (FEC) of media encapsulated in Real-Time transport Protocol (RTP). The payload format allows end-systems to transmit using arbitrary block lengths. The FEC is transmitted as a separate data stream.

With reference to FIG. 3c an exemplary transmitter-network-receiver arrangement is illustrated by the means of a block diagram. It should be noted that the block diagram includes modules and/or functions on transmitter and receiver side, respectively, which are required for understanding the inventive concept. The implementation on transmitter and receiver side is not complete. On transmitter side, designated also as server side, video packets to be transmitted to the receiver side, designated also as client side, as provided in encoded from for instance by a video data storage such as a database 400 or by an video encoder 401, e.g. a H.264 encoder, fed with a video input signal. The video packets are supplied to an FEC encoder 402, which generates and provides the FEC protection data packets in accordance with predefined FEC generation parameters and settings.

When sub-sequences are not used, all packets are equally protected by FEC, preferably. When sub-sequences are in use, only the packets carrying video of the main sequence may be protected by FEC. In this case, the overhead for the FEC is comparatively low such that the transmission is bandwidth-efficient, but the FEC block spans a long period in the time domain and that may result in a relative long time delay for regaining a frame when FEC repair in required. Alternatively, some or all data packets belonging to a sub-sequence adjacent to the packets belonging to a frame of the main sequence may be protected by FEC. In this case, the FEC overhead is higher, because packets belonging to frames in the sub-sequence are protected, but the delay until frame quality is regained after FEC repair is lower. Designers of transmitters may tune this trade-off according to principle network conditions and aspects and user's wishes and needs.

The data packets are conveyed from the transmitter (by the means of a network interface 403 implementing a UDP interface 405) to the receiver (by the means of a corresponding network interface 414 implementing a UDP interface 415) via a packet-based network, which may be prone to erasures, losses and the like. The erasure prone communication network may be especially a cellular communication network. This means, during transmission, packets may get lost. At the receiver, data packets are received as they arrive from the network interface 414. This means that packets may be out of order, damaged, or lost. Damaged packets are advantageously discarded. In most implementations, this is done through the UDP (Universal Datagram Protocol) implementation. All correct packets are supplied to a dejitter buffer 416, which is used to re-order the packets. The re-ordering may be achieved for example through a RTP sequence number.

Advantageously, the transmitter is made aware of the quality of the connection, e.g. through RTCP (Real-Time transport Control Protocol) receiver reports, of the data packet loss rate so that the transmitter can adjust the FEC strength such that FEC repair can compensate for most or all data packet losses, but no excessive number of repair packets might be generated during FEC processing. The conveyance of the quality of the connection may be implemented on the basis of Quality-of-Service (QoS) modules 413 and 403 on receiver and transmitter side, respectively. The QoS module 413 determines the quality of the connection and conveys the determined quality to the corresponding QoS module 403 on transmitter side, which can tune the FEC generation operated by the FEC encoder and or parameters and settings of the network interface 404. The process described above is discussed in much greater detail in RFC 3550 (concerning packet transmission and quality reporting) and RFC 2733 (concerning FEC generation and repair). The RFC 3550 can be obtained from the Internet Engineering Task Force (IETF) and is referenced herewith for inclusion. It should be obvious to those skilled in the art that other protocol hierarchies could be used for similar purposes. The invention is not limited to the protocol implementation as described in RFC 3984, 3550, and 2733, which may be considered for implementing the present invention.

The following description of the inventive concept is based on the assumption that data packets carrying video, which will also be designated as video packets and data packets carrying FEC repair data, which will be also designated as repair packets, have been generated at the transmitter. It is further assumed that in case sub-sequences are not used, all video packets are part of the FEC block and hence FEC protected. In case sub-sequences are in use, it is assumed that the FEC block encompasses only video packets belonging to the main sequence. Hence, video packets belonging to the sub-sequences are not FEC protected. Theses assumptions are only made for the sake of simplicity. Those skilled in the art will appreciate that the present invention in not limited thereto, the FEC protection may also encompasses video packets belonging to the main sequence and one or more sub-sequences.

With reference to FIG. 5*a*, a FEC block encompasses three video packets M1, M2, M3. The next FEC block encompasses the subsequent three video packets M4, M5, M6 and so forth. The data packets diagrams shown in the following figures should be interpreted as a timeline. The video packet and repair packet sequence as transmitted on transmitter/server side is illustrated accordingly in FIG. 5*b*.

First, a video packet is received by removing it from the dejitter buffer 416. In case the video packet belongs to the same FEC block as the previous video packet, it is stored for potential future use in FEC repair buffer (of the FEC decoder 412). If the video packet has been received correctly and is identified as the next video packet in sequence number ordering (in other words: no packet loss has been detected in the video packet sequence), it is forwarded towards the video decoder 411 for reconstruction and video output.

If a video packet of a FEC block is missing or has been incorrectly received, neither this video packet nor any later video packet is immediately forwarded to the video decoder 411. Instead, all remaining video packets of the FEC block, and all repair packets associated with this FEC block are received and buffered. The receiving and buffering may require a waiting period until all packets belonging to the FEC block have been received on receiver/client side. Once all video and repair packets of the FEC block have either been received or identified as lost, the FEC decode algorithm implemented by the means of the FEC decoder 412 attempts repair. The video decoder is set to idle state; i.e. the displaying of the video sequence is frozen starting with the first video packet that has been lost/damaged and triggered the FEC repair process. Independent of the success of the FEC repair attempt, the video packets of the repaired FEC block, starting with the first video packet that has been lost/damaged and triggered the FEC repair process, are forwarded to the video decoder. Since the video decoder 411 has been kept idle for the time necessary to receive the remaining video packets of the FEC block (waiting time), the one or more repair packets, and the time required for the FEC repair operation, the video decoder is required now to accelerate the video decoding so to "catch up" with the real-time packet transmission. This is depicted in FIG. 5 by the short arrows between M2, M3, and M4 after FEC reconstruction. Hence, the video decoder needs to be provisioned to be faster than originally necessary. Furthermore, the user experience suffers slightly by a short frame freeze, followed by a short period of high frame rate (the latter could be substituted by an extended period of frame freeze if the decoder implementation chooses not to display the accelerated decoded pictures). It should be understood that the video packets are forwarded to the video decoder regardless of the success of the reconstruction attempt. If that attempt was successful, then the frame quality will be perfect after the two mentioned brief periods of frame freeze and high frame rate. If the attempt was unsuccessful (for instance due to insufficient FEC strength), the same artifacts will propagate over time that would be visible without employing FEC repair, and conventional means, which are out of the scope of the present invention, might be employed to clean up the frame(s) and improve its/their quality.

As mentioned above, the video packets are FEC protected and hence a predefined number of video packets belong to exactly one FEC block. First, a video packet is received by removing it from the dejitter buffer 416. If the video packet fetched from the buffer 416 belongs to the same FEC block as the previous video packet, it is stored for potential future use in the FEC repair buffer. If the packet has been received correctly and is identified as the next video packet in sequence number ordering (in other words: no packet loss has been detected in the video packet sequence), it is forwarded towards the decoder for reconstruction and video output.

In accordance with another embodiment of the present invention illustrated in FIGS. 6a, if a video packet of a FEC block is missing or incorrectly received, the video decoder 411 saves its state so to allow future re-synchronization at this point. The exact operations to save a state of a video decoder are highly depended on the video compression standard and the decoder implementation. As an example, a typical H.264 baseline video decoder needs to save at least all reference frames, the reference frame lists, all parameter sets, and perhaps some internal variables. The detailed operation of video decoder is out of the scope of the present invention.

Once the decoder state is saved, the remaining video packets of the FEC block are received and forwarded to the video decoder 411. The video decoder 411 reconstructs them and displays a distorted frame image due to packet loss or rejection.

Once the last video packet belonging to the current FEC block is received and processed by the video decoder 411, the stored copies of all received video and repair packets are utilized by the FEC decoder 412 to attempt repair of the rejected or lost video packet. In case that the repair is unsuccessful, the stored state of the video decoder is discarded and video decoding continues with the first video packet of the next FEC block. In this case, the video quality is distorted and means not discussed here might used to clean up the frames.

However, in case the FEC decoding was successful, the video decoder 411 restores its state with the decoder state stored previously. Then, the video packets of the FEC block starting with the first packet that was damaged/rejected or lost and reconstructed by the FEC repair process are processed by the video decoder 411. The operation of the video decoder 411 requires accelerated decoding as mentioned above to catch up the time synchronization of the video sequence to be outputted for displaying. The user experience according to this embodiment of the present invention differs slightly from that of the previous embodiment of the present invention described above. There is no brief period of frozen frame display, as the video decoder continues to operate even with known errors in the bit-stream of the video packets. However, the frame quality in case of an error (even if this error is corrected later by FEC) is distorted for a brief period of time.

The video packet and repair packet sequence as transmitted on transmitter/server side is illustrated accordingly in FIG. 6b.

A disadvantage of the implementations according to the embodiments of the present invention described above is that they require accelerated decoding, which is problematic from a commercial point of view due to the manifold computational complexity. In this further embodiment of the present invention, sub-sequences are employed to alleviate this disadvantage to some extend. Sub-sequences as discussed above are employed. For the sake of simplicity, only a main sequence and one sub-sequence are considered henceforth; however, the inventive concept is not limited thereto. Those skilled in the art will appreciate on the basis of the following description of this embodiment that also more than one sub-sequence layer may be employed. Again, it should be assumed that the video packets carrying information belonging to frames of the main sequence are FEC protected; henceforth called "main (video) packets". Video packets belonging to sub sequences are conveyed FEC unprotected.

It is possible that some decoding environments don't have enough processing power to accelerate decoding. There exist several mechanisms, which may be used to tackle the problem. In one exemplary embodiment, the decoder may use temporal reduction to catch up the original pace. Referring to FIG. 5a, this may be implemented by skipping, i.e. not decoding frame M3, as by example. In other embodiment, accelerated decoding may last longer than presented in FIG. 5a, in which original pace is caught up during fractions of normal fps-rate. The former embodiment implements faster catch-up, while suffering a possibility of jerk due missing frame, and the latter embodiment implements a slower catch-up without jerk due missing frames.

The implementation of this embodiment will be described on the basis of the diagrams shown in FIGS. 7a and 7b representing an exemplary video packet sequence. Assume that each frame is conveyed in a single packet. Assume further, each sub-sequence consists of four frames. Assume finally, that a FEC block consists of three main packets and a single repair packet, which is generated and conveyed according to RFC 2733 (referenced above). With reference to FIG. 5a, the sending order of the video packets in structured hierarchy is depicted. Main packet M1 is sent first, followed by the four video packets of the sub sequence. Then main packet M2 follows, and another sub sequence, and M3 and another subsequence. After generation and sending of M1, M2, and M3, the FEC encoder generates a FEC repair packet and sends it. When using RFC 2733 recommendation for FEC generation and transmission, the FEC repair packet is send in its own RTP session. The FEC encompassing process restarts with M4. The resulting video and FEC repair packet sequence as described above is additionally illustrated with reference to FIG. 7b.

With reference to FIG. 7c, it should be assumed that the (main) video packet M2 has been lost at the receiver side. Loss of the video packet M2 may be caused due to damage detection of the video packet M2, rejection of the video packet M2, erasure of the video packet M2 due to transmission conditions, to which the communication network is subjected, and the like. The video decoder 511 stores the decoder state upon detection of the lost/damage of the video packet M2 and continues decoding with the sub-sequence pictures temporally located between the video packets M2 and M3, and with the video packet M3. After reception of the video packet M3 and the associated FEC repair packet, the FEC decoder 412 attempts a FEC repair. If unsuccessful, the decoding continues with a corrupt reference frame (here exemplarily video packet M2 in the main sequence due to loss of video packet M2).

In case the FEC repair was successful, the sub-sequence frames s9 . . . s12 are not forwarded to the video decoder 411. The time and processing cycles reserved for their decoding, instead, is used to restore the video decoder state to its last incorrupt state by reconstruction of the video decoder state with the help of the stored decoder state, which has been saved after detection of missing video packet M2, and the decoding of M2, M3 and M4 is performed.

With reference to FIGS. 8a to 8c a further embodiment of the present invention is provided, which illustrates the inventive concept on the basis of any form of layered video coding as discussed above. For the sake of simplicity, a two-layer stream is considered henceforth; however, the scheme could be also employed for more than one enhancement layer.

The FEC protects all video packets carrying information belonging to pictures of the base and main layer, respectively; henceforth called "main (video) packets". Video packets belonging to the enhancement layer are assumed to be FEC unprotected.

The operation and implementation of this embodiment will be described with reference to FIGS. 8a, 8b, and 8c. FIG. 8a depicts exemplary prediction dependencies and layering structure of the frames on the basis of an example bit-stream. Enhancement layer frames e1 and e6 are (hierarchically) upward-predicted from the corresponding base (main) layer frame M1 and M6, respectively, whereas the remaining enhancement layer frames are both upward-predicted and forward-predicted from the respective previous enhancement layer frame. It should be assumed that each frame is conveyed in a single data packet and a FEC block encompasses three main video packets and a single FEC repair packet, which is for instance generated and conveyed according to RFC 2733 (referred above). The transmission order of the data packets is M1, e1, M2, e2, M3, FEC repair packet, and e3. When employing RFC 2733 (referred above), the FEC repair packet is transmitted in its own RTP session. The transmission process is repeated analogously and the transmission order is M4, e4, M5, e5, M6, FEC repair packet, e6. Thereafter, the transmission processes is repeated analogously in turn. FIG. 8b illustrates the transmission order.

With reference to FIG. 8c, it should be again assumed that video packet M2 has been lost at receiver side. The video decoder 411 stores the decoder state upon detection of the loss of video packet M2 and continues decoding with subsequent pictures (e2 and M3). The video decoder 511 may conceal the loss of M2 using any error concealment algorithm. The employment of any error concealment algorithm results in a video decoder output e2* reproduced on the basis of a damaged video packet M2 or on the basis of the previous video packets M1 and e1 in combination with video packet e2 and error concealment algorithm used. Before detection of the loss of video packet M2, the video decoder 411 has outputted the video frame e1 reconstructed at least on the basis of video packet M1 of the main layer and video packet e1 of the enhancement layer. After reception of M3 and the associated FEC repair packet (see transmission order illustrated in FIG. 8b), the FEC decoder 412 attempts a FEC repair. If unsuccessful, the decoding continues with a corrupt reference frame in the main sequence due to the loss of video packet M2.

In case the FEC repair was successful, the enhancement layer frames e3, e4, and e5 are not forwarded to the video decoder 411. The time and processing cycles reserved for their decoding (i.e. the decoding of the frames e3, e4 and e5), instead, is used to restore the video decoder state to its last incorrupt state (the video decoder state has been stored after detection of missing M2; see above) and the decoding of video packets M2, M3 and M4. It should be noted that the next enhancement layer frame to be supplied to the video decoder 411 after the retroactive decoding process (restore of the video decoder state) must be upward-predicted only. In spatial and coarse granularity quality scalability, it is not beneficial from compression efficiency point of view to use only upward prediction and therefore only-upward-predicted frame may not occur frequently in the bit-stream and therefore there may be a considerable delay in restarting the decoding of the enhancement layer. Consequently, the invention is particularly applicable to fine granularity scalability (FGS), in which restarting the decoding of the enhancement layer can be done at any picture. It should be noted that such a FGS decoder has bee described above in detail.

The following FIGS. 9a to 10d show flow diagrams, which illustrate operational sequences as described above with reference to the time sequence diagrams according to embodiments of the present invention. With reference to FIGS. 9a and 9b the overall operations of the exemplary portable CE device 100 illustrated in FIG. 1 operating in the system illustrated in FIG. 3c will be described. More detailed operations according to embodiments of the present invention are depicted in the following FIGS. 10a to 10d and will be described with reference thereto.

Referring to FIG. 9a, network operations of the portable CE device 100 acting as client device according to the exemplary system of FIG. 3c is illustrated. The portable CE device 100 receives a digital video bit-stream from a server/transmitter. The digital video bit-stream should be transmitted over a packet-based network. The received digital video bit-stream should be structured as described above. Each coded frame is conveyed in one or more data packets.

As described above the inventive concept is based on the assumption that data packets carrying video and data packets carrying FEC repair data have been generated at the server/transmitter side. It is further assumed that in case sub-sequences are not used, all video packets are part of FEC blocks and hence FEC protected. In case sub-sequences are in use, it is assumed that the FEC block encompasses only video packets belonging to the main sequence. Hence, video packets belonging to the sub-sequences are not FEC protected. Moreover, due to bandwidth consideration, i.e. saving of network resources, each FEC block should encompass several video packets for protection; refer to the table above for minimum overhead considerations. With reference to the frame sequences in time, the FEC block encompasses a number of three video packets of the main sequence (corresponding to the base layer). The number of main (sequence) video packets encompassed by a FEC block may vary from the exemplarily defined number; the number of main (sequence) video packets encompassed by a FEC block is adaptable in accordance with network bandwidth considerations and requirements, quality of service and the like.

In operation S100, the reception of the digital video sequence comprising video packets and FEC repair packets is initiated, preferably upon user interaction, by the portable CE device 100 or any application running thereon, upon initiation notification by the transmitter/server, etc.

In operation S101, the video packets (belonging to the main sequence and/or the sub-sequence(s)) as well as FEC repair packets are received via the network interface of the portable CE device 100, for instance the cellular interface 180, the general network interface 414, or any other network interface supporting packet-based data communication services, preferably IP-based data communications.

In operation S102, the received video data packets are supplied to the dejitter buffer 416 for ordering the video packets in sequence.

In an operation S103, it is checked whether the video sequence has been completely transmitted. In case further video/repair packets of the digital video sequence are expected, the operational sequence branches to operation S101 enabling to receive these further expected packets. Otherwise, the reception of the video sequence is finished and the operational sequence ends in operation S104.

With reference to FIG. 9b, the packet handling of the data packets belonging to the video sequence is illustrated on the basis of an embodiment of the present invention. The packet handling is preferably operated independently and essentially in parallel to the network operation described with reference to FIG. 9a.

In operation S110, the video/repair packet handling is started, preferably when a first data packet is forwarded by dejitter buffer 416, which is responsible to sort the data (video/repair) packets into the original sequence.

In operation S111, a video packet is retrieved from the dejitter buffer 416 and in operation S111, it is checked whether there is one or more data packets available in the dejitter buffer 416. In case there are not any data packets available, the operational sequence is finish in operation S115.

Otherwise, the data packet (next in sequence) is received from the dejitter buffer 416 in operation S113 and the received data (video/repair) packet is supplied to the video packet processing in operation S114. The video packet processing will be described below with reference to FIGS. 10a to 10d. After video packet processing, the operational sequence braches to S111 for retrieving a next data packet.

With reference to FIGS. 10a to 10d, the video packet processing according to an embodiment of the present invention is described in detail. Referring to FIG. 10a, the overall video processing operation is described, while FIGS. 10b to 10d illustrate complex sub-operations thereof in detail.

In operation S120, the video/repair packet processing is started.

In operation S121, it is first checked whether the video packet, which is currently processed, belongs to the same FEC block as the previous video packet. If not, the FEC repair buffer is initiated or another section thereof is addressed in operation S122. Thereafter or in case the current video packet belongs to the same FEC block, the vide packet is buffered in the FEC repair buffer to enable an eventually future repair process.

In next operation S124, it is checked, whether the video packet has been received correctly (i.e. undamaged) and the video packet is the next video packet in sequence (i.e. not lost). In case of the check matches, i.e. the video packet is received correctly and is the next in sequence; the video packet is forwarded in operation S125 to the video decoder 411 for reproduction of the video frame to enable display the video frame encoded in the video packet. The video packet processing is finished and ends in operation S129.

Otherwise, i.e. in case of a damaged/lost video packet, the exception handling according to an embodiment of the present invention is initiated.

In operation S126, operation of the video decoder is controlled according to an embodiment of the invention and in operation S127, FEC repair processing is started. The operations S126 and S127 are performed substantially in parallel.

After finish of the FEC repair process, the video decoder is instructed for accelerated reproduction, in an operation S128, in order to achieve synchronization with the video bit-stream comprised of the data packets received by the portable DE device 100 via its cellular/network interface 180 or 414.

The operations S126 to S128 will be described in the following in form of sub-sequences.

Referring to FIG. 10b, the video decoder control according to an embodiment of the present invention is illustrated.

In operation S130, the operation of the video decoder 411 is controller. Two possibilities to control the operation of the video decoder 411 are suitable according to embodiments of the invention. The first possibility to control the operation of the video decoder 411 will be described with reference to operations S131 to S137; the second possibility to control the operation of the video decoder 411 will be described with reference to operations S140 to S143.

In operation S131, the first option to control the video decoder 411 according to an embodiment of the present invention begins. In operation S132, the current operation state of the video decoder 411 is determined and stored/buffered in a correspondingly provided state storage. The exact operations to save a state of a video decoder are highly depended on the video compression standard and the decoder implementation. In operations S133 to S136, the remaining video/repair packets of the FEC block are received frame-wise from the dejitter buffer 416 and forwarded to the video decoder 411. The video decoder 411 reconstructs them, which may imply the display of distorted frame image due to packet loss, packet rejection, or packet damage. In operation S134, the received video packets and (if present) FEC repair packet of the FEC block are stored in the FEC repair buffer to be available for the FEC repair process waiting the data packets required for FEC repair. In operation S135, any error concealment algorithm may be applied (by the video decoder 411) to conceal the damaged, rejected or lost video package. In operation S137, it is check whether the video decoder state is to be restored. The signal to restore the state of the video decoder 411 is caused upon finish of the FEC repair process (c.f. also S127 of FIG. 10a), which is described in detail with reference to FIG. 10c. In case the FEC repair process has not signalized its completion, the operational sequence braches to S133 to display the remaining video packets frame-wise. Upon signalization of the restoring of the video decoder state in operation S138, the video decoder state is restored in accordance with the stored state retrieved from the state storage (c.f. operation S132 above). The video decoder is re-set into the state, which has been active at that moment in time at which the damaged/lost video packer has been detected and FEC repair process has been triggered. Hence, the video decoder control is finished in following operation S146.

In operation S140, the second option to control the video decoder 411 according to an embodiment of the present invention begins. In operation S141, the video decoder is set into idle state, which results in freezing of the display of the video sequence. The stopping to the video decoder operation is triggered in coordination with the detection of the damage or loss of the video packer and the initiating of the FEC repair process referred to in operation S127 illustrated in FIG. 10a and described in detail with reference to FIG. 10c. In operations S142 and S143, the remaining video/repair packets of the FEC block are received frame-wise from the dejitter buffer 416 and the received video packets and (if present) FEC repair packet of the FEC block are stored in the FEC repair buffer to be available for the FEC repair process waiting the data packets required for FEC repair. In operation S144, it is check whether the video decoder operation is to be reactivated. The signal to reactivate the operation of the video decoder 411 is caused upon finish of the FEC repair process (c.f. also S127 of FIG. 10a), which is described in detail with reference to FIG. 10c. Upon reactivation, the idle state of the video decoder is cancelled in operation S145 and the video decoder 411 is again enabled to decode video packets forwarded thereto. This means, the video decoder 411 is set into its last incorrupt state. Hence, the video decoder control is finished in following operation S146.

Referring to FIG. 10c, the FEC repair processing according to an embodiment of the present invention is illustrated.

In operation S150, the FEC repair process is initiated. To start the actual FEC repair algorithm, all available video packets and FEC repair packet(s) are required. Therefore, the process is in wait state, in operation S151, until the video and FEC repair packets (expect the lost/rejected video packet) are stored in the FEC repair buffer, which is performed in operation S123 of FIG. 10a, and operations S134 and S143 of FIG. 10b. In case the set of data packets is completely available in the FEC repair buffer, i.e. the last FEC repair packet belonging to the FEC block, which the damaged/lost video packet belongs to (which detection has triggered the FEC repair process), the operational sequence continues with operation S153. The received and stored video and repair packets required for FEC repair are retrieved from the FEC repair buffer and the FEC repair algorithm implemented in the FEC decoder 412 is applied to them in subsequent operation S134. Implementation details of the FEC repair techniques and FEC decoder are out of the scope of the present invention and are known by those skilled in the art. Exemplarily, reference should be given to RFC 3550 (concerning FEC transmission) and RFC 2733 (concerning FEC generation and repair). After finish of the FEC repair, independently whether successful or not, the reactivate/restore signal is sent to the video decoder control, especially to the checking operations S137 and S144 thereof, respectively. Thereafter in operation S155, the repaired video packets are forwarded to the video decoder 411 for being decoded to be displayed. The forwarding is performed independently from the FEC repair result, i.e. also even in case of an unsuccessful FEC repair attempt. In operation S156, the FEC repair processing is completed and ends.

Referring to FIG. 10d, the video decoder acceleration according to an embodiment of the present invention is illustrated.

In operation S160, an accelerated operation of the video decoder 411 is initiated. The manner of acceleration differs depending whether one or more sub-sequences are present in the video sequence, i.e. the video bit-stream has a layered encoding. The presence of one or more sub-sequences is check in operation S161. In case one or more sub-sequences are not present in the encoded/compressed video sequence, the operational sequence braches to operations S162 to S165. Otherwise, the operational sequence braches to operations S166 to S173.

In operation S162, the decoding process of the video decoder is accelerated such that the video decoder achieves a higher frame rate in video output; i.e. the period for decoding a video packet (video frame) is shortened. Thereafter, the repaired video packets resulting from the FEC repair process (independently whether the repair process was successful or not) are forwarded frame-wise and packet-wise to the video decoder 411 in operations S163 and S164, until all repaired video packets of the FEC repair block have been forwarded. The video decoder 411 decodes the video packet at accelerated frame rate and provides these for outputting/displaying. If all repair video packets of the FEC repair block have been forwarded, the operation continues with operation S165. In case that the accelerated video decoder operation during repaired video packet decoding has not result in reaching synchronization with the packet-based transport mechanism of the digital encoded video sequence reception, i.e. such as IP/UDP/RTP/RFC 3984, the video decoder 411 is configured to maintain the accelerated operation until required synchronization is obtained, in operation S165. The video decoder acceleration sequence is finished in operation S174.

In operation S166, it is checked whether the FEC repair attempt was successful. In case of a successful FEC repair, the operational sequence braches to operations S167 to S170. Otherwise the operations S171 to S173 are performed.

In operation S167, the video decoder 411 is configured to stop decoding of video packets belonging to one or more pre-defined sub-sequences. The time and processing cycles reserved for their decoding (i.e. the decoding of the video packets belonging to the one or more predefined sub-sequences, which decoding has been stopped or suspended), instead, is used to restore the video decoder state to its last incorrupt state and the decoding of repaired video packets to be decoded. Thereafter, the repaired video packets resulting from the FEC repair process (independently whether the repair process was successful or not) are forwarded frame-wise and packet-wise to the video decoder 411 in operations S168 and S169, until all repaired video packets of the FEC repair block have been forwarded. If all repair video packets of the FEC repair block have been forwarded, the operation continues with operation S170. In case the time-saving gained by stopping/suspending the decoding of one or more pre-defined sub-sequences and the video packets belonging to is not sufficient to reach synchronization with the packet-based transport mechanism of the digital encoded video sequence reception, i.e. such as IP/UDP/RTP/RFC 3984, the video decoder 411 is configured to maintain the stopping/suspending of the one or more pre-defined sub-sequences until required synchronization is obtained, in operation S170. Additionally, the video decoder 411 is configured to restart with the decoding of the video packets belonging to the one or more predefined sub-sequences, which decoding has been stopped or suspended, when a only-upward-predicted frame is coded in a video packet belonging to the one or more predefined sub-sequences. Due to the suspended sub-sequence decoding, the video decoder is not able to restart decoding video packets coding both upward-predicted and forward-predicted frame. The video decoder acceleration sequence is finished in operation S174.

In operations S172, the video packets resulting from an unsuccessful FEC repair attempt are discarded and the decoding of the digital video sequence is continued with a corrupted reference frame (which is the frame, which is coded in the damaged/lost video package of the main sequence). An error concealment algorithm may be applied in order to compensate for artifacts to some extend. Thereafter, the video decoder acceleration sequence is finished in operation S174.

Those skilled in the art will appreciate that the present invention in not limited thereto, the FEC protection may also encompasses video packets belonging to the main sequence and one or more sub-sequences.

It will be understood that various details of the invention may be changed without departing from the scope of the present invention. Furthermore, the foregoing description is for the purpose of illustration only, and not for the purpose of limitation—the invention being defined by the claims.

The invention claimed is:

1. Device, comprising:
   a network interface for receiving one or more video data packets of an error recovery block of a video sequence transmission and one or more repair data packets associated with said error recovery block;
   a repair buffer for storing said one or more received video data packets of said error recovery block and said one or more received repair data packets associated with said error recovery block;
   an error recovery decoder for checking said stored video data packets for loss or data error, and for generating repaired video data packets on the basis of said stored video data packets and repair data packets of error recovery block, to which any lost or erroneous video data packets belong, when at least a mathematically sufficient number of said stored video data packets and repair packets are available at said repair buffer for successful error recovery;

a video decoder for decoding, out of synchronicity with an original frame time sequence of said video sequence, at least said repaired video data packets supplied by said error recovery decoder; and a decoder state buffer, when triggered by said error recovery decoder detecting lost or erroneous video data packets, for storing a decoder state of said video decoder and, when receiving a restore signal from said error recovery decoder for restoring said decoder state of said video decoder.

2. Device according to claim 1, comprising:

a delay component of said video decoder which is triggered by said error recovery decoder detecting lost or erroneous video data packets, for delaying said decoding by said video decoder of said repaired video data packets and all video data packets following a first of said repaired video data packets, for a period of waiting time;

an acceleration component of said video decoder, which receives a reactivate signal from said error recovery decoder, for accelerating a decoding frame rate of said video decoder decoding said repaired video data packets and all video data packets following the first of said repaired video data packets; and a de-acceleration component of said video decoder for de-accelerating said decoding frame rate of said video decoder when said synchronicity with said original frame time sequence is achieved.

3. Device according to claim 1, comprising:

a suspending component for suspending decoding by said video decoder of video data packets of at least one enhancement layer of said video sequence transmissions to gain processing capacity at said video decoder for said decoding.

4. Device according to claim 3, comprising a resuming component for resuming decoding of said at least one enhancement layer when synchronicity with said original frame time sequence is achieved.

5. Device according to claim 3, comprising a resuming component for resuming decoding said video data packets when an only-upward predicted frame is available at said video decoder for decoding.

6. Device according to claim 1, wherein said video decoder receives from said error recovery decoder at least said video data packets belonging to said error recovery block during said error recovery with exception of one or more lost video data packets and decodes said received video data packets.

7. Device according to claim 6, wherein said error recovery decoder is configured to apply a compressed-domain error concealment technique to said video data packets to improve quality.

8. Device according to claim 6, wherein said error recovery decoder is configured to apply a reconstructed-domain error concealment technique to pictures reconstructed from said video data packets to improve quality.

9. Video decoder apparatus, comprising:

a data input connected to an error recovery decoder, for receiving repair video packets from said error recovery decoder, wherein said error recovery decoder is adapted to check video data packets for loss or data error, which video data packets of an error recovery block of said video sequence transmission and one or more repair data packets associated with said error recovery block are received by a network interface and stored in a repair buffer connected to said network interface and said error recovery decoder, to generate said repaired video packets on the basis of said stored video data packets and repair data packets of said error recovery block, to which any lost or erroneous video data packet belongs, when at least a mathematically sufficient number of said stored video data packets and repair packets are available at said repair buffer for successful error recovery, wherein said video decoder apparatus decodes, out of synchronicity with an original frame time sequence of said video sequence, at least said repaired video data packets supplied by said error recovery decoder, wherein said video decoder apparatus further comprises a decoder state buffer for storing a decoder state of said video decoder apparatus, when triggered by said error recovery decoder detecting lost or erroneous video data packets, and for restoring said decoder state of said video decoder apparatus, when receiving a restore signal from said error recovery decoder.

10. Video decoder apparatus according to claim 9, further comprising:

a delay component, triggered by said error recovery decoder detecting lost or erroneous video data packets, for delaying said decoding by said video decoder apparatus of said repaired video data packets and all video data packets following a first of said repaired video data packets, for a period of waiting time;

an acceleration component, responsive to a reactivate signal from said error recovery decoder for accelerating, a decoding frame rate of said video decoder apparatus decoding said repaired video data packets and all video data packets following the first of said repaired video data packets; and a de-acceleration component for de-accelerating said decoding frame rate of said video decoder apparatus, when said synchronicity with said original frame time sequence is achieved.

11. Video decoder apparatus according to claim 9, wherein said video decoder apparatus receives from said error recovery decoder at least said video data packets belonging to said error recovery block during said error recovery with exception of one or more lost video data packets and decodes said received video data packets.

12. Video decoder apparatus according to claim 9, wherein said video decoder apparatus is further adapted to apply a compressed-domain error concealment technique to said video data packets to improve quality.

13. Video decoder apparatus according to claim 9, wherein said video decoder apparatus is further adapted to apply a reconstructed-domain error concealment technique to pictures reconstructed from said video data packets to improve quality.

14. Video decoder apparatus according to claim 9, comprising:

a suspending component for instructing said video decoder for suspending decoding of video data packets of at least one enhancement layer of said video sequence transmission to gain processing capacity at said video decoder for said decoding.

15. Video decoder apparatus according to claim 9, comprising:

a resuming component for instructing said video decoder for resuming decoding of said at least one enhancement layer, when synchronicity with said original frame time sequence is achieved.

16. Video decoder apparatus according to claim 9, comprising:

a resuming component for resuming decoding said video data packets, when an only-upward predicted frame is available at said video decoder for decoding.

17. System, comprising:
interface means for receiving via a network one or more video data packets of an error recovery block of a video sequence transmission and one or more repair data packets associated with said error recovery block;
storing means for storing said video data packets of said error recovery block and said repair data packets received by said interface means;
error recovery means for checking said stored video data packets for loss or data error and for generating repair video packets on the basis of said stored video data packets and repair data packets of said error recovery block, to which said lost or erroneous video data packet belongs, when at least a mathematically sufficient number of said stored video data packets and repair packet are available at said storing means for successful error recovery;
decoder means for decoding, out of synchronicity with an original frame time sequence of said video sequence, at least said repaired video data packets supplied by said error recovery means; and
state buffer means, when triggered by said error recovery decoder detecting lost or erroneous video data packets, for storing a decoder state of said decoder means and, when receiving a restore signal from said error recovery decoder, for restoring said decoder state of said decoder means.

18. System according to claim 17, comprising:
delay means, responsive to a trigger signal from said error recovery means detecting lost or erroneous video data packets, for delaying said decoding by said decoder means of said repaired video data packets and all video data packets following a first of said repaired video data packets, for a period of waiting time
acceleration means, which receives a reactivate signal from said error recovery means, for accelerating a decoding frame rate of said video decoder decoding said repaired video data packets and all video data packets following the first of said repaired video data packets; and
de-acceleration means for de-accelerating said decoding frame rate by said decoder means when said synchronicity with said original frame time sequence is achieved.

19. System according to claim 17, comprising:
suspending means for suspending decoding by said decoder means of video data packets of at least one enhancement layer of said video sequence transmission to gain processing capacity at said decoder means for said decoding.

20. System according to claim 17, comprising:
resuming means for resuming decoding of said at least one enhancement layer, when synchronicity with said original frame time sequence is achieved.

21. System according to claim 17, comprising:
resuming means for resuming decoding said video data packets, when an only-upward predicted frame is available at said decoder means for decoding thereat.

22. System according to claim 17,
wherein said error recovery means applies a compressed-domain error concealment technique to said video data packets to improve quality.

23. System according to claim 17,
wherein said error recovery decoder applies a reconstructed-domain error concealment technique to pictures reconstructed from said video data packets to improve quality.

24. Controller apparatus, comprising:
a data input which is connected to an error recovery decoder, for receiving one or more video data packets of an error recovery block of a video sequence transmission and one or more data packets are repair data packets associated with said error recovery block from a network interface,
a repair buffer for storing said received video data packets of said error recovery block and said received repair data packets associated with said error recovery block; and
an error recovery decoder for checking said stored video data packets for loss or data error and for generating repaired video data packets on the basis of stored video data packets and repair data packets of said error recovery block, to which any lost or erroneous video data packet belongs, when at least a mathematically sufficient number of stored video data packets and repair data packets are available at said repair buffer for successful error recovery,
wherein said controller apparatus instructs said video decoder supplied with said repair data packets from said error recovery decoder to decode, out of synchronicity with an original frame time sequence of said video sequence, at least said repaired video data packets supplied by said error recovery decoder process, wherein said controller apparatus instructs said video decoder for saving a decoder state to a decoder state buffer, when triggered by said error recovery decoder detecting lost or erroneous video data packets, and restoring said decoder state of said video decoder from said decoder state buffer, when receiving a restore signal from said error recovery decoder.

25. Controller apparatus according to claim 24, wherein said controller apparatus instructs a delay component of said video decoder in response to a trigger signal from said error recovery detector detecting lost or erroneous video data packets, for delaying said decoding of said repaired video data packets and all video data packets following a first of said repaired video data packets, for a period of waiting time,
wherein said controller apparatus instructs an acceleration component of said video decoder, which receives a reactivate signal from said error recovery decoder, for accelerating a decoding frame rate of said video decoder decoding said repaired video data packets and all video data packets following said first of said repaired video data packets;
wherein said controller apparatus instructs a de-accelerating component of said video decoder for de-accelerating said decoding frame rate, when said synchronicity with said original frame time sequence is achieved.

26. Controller apparatus according to claim 24, wherein said controller apparatus is further adapted to instructs said video decoder for decoding at least said video data packets, which are received from said error recovery decoder and which belong to said error recovery block, during said error recovery with exception of one or more lost video data packets.

27. Controller apparatus according to claim 26, wherein said controller apparatus instructs said error recovery decoder for applying a compressed-domain error concealment technique to said video data packets to improve quality.

28. Controller apparatus according to claim 26, wherein said controller apparatus instructs said error recovery decoder for applying a reconstructed-domain error concealment technique to pictures reconstructed from said video data packets to improve quality.

* * * * *

UNITED STATES PATENT AND TRADEMARK OFFICE
CERTIFICATE OF CORRECTION

PATENT NO. : 7,617,436 B2
APPLICATION NO. : 11/196789
DATED : November 10, 2009
INVENTOR(S) : Stephan Wenger, Miska Hannuksela and Imed Bouazizi It is certified that error appears in the above-identified patent and that said Letters Patent is hereby corrected as shown below:

In column 42, line 51 (claim 26, line 2) "is further adapted to" should be deleted.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,617,436 B2 |
| APPLICATION NO. | : 11/196789 |
| DATED | : November 10, 2009 |
| INVENTOR(S) | : Wenger et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Nineteenth Day of October, 2010

David J. Kappos
*Director of the United States Patent and Trademark Office*